United States Patent
Pan et al.

(10) Patent No.: US 11,140,545 B2
(45) Date of Patent: Oct. 5, 2021

(54) METHOD, APPARATUS, AND SYSTEM FOR PROTECTING DATA

(71) Applicant: HUAWEI TECHNOLOGIES CO., LTD., Guangdong (CN)

(72) Inventors: Kai Pan, Shanghai (CN); He Li, Shanghai (CN); Jing Chen, Shanghai (CN); Li Hu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/522,278

(22) Filed: Jul. 25, 2019

(65) Prior Publication Data
US 2019/0349406 A1   Nov. 14, 2019

Related U.S. Application Data

(63) Continuation of application No. PCT/CN2017/072782, filed on Jan. 26, 2017.

(51) Int. Cl.
| | |
|---|---|
| *H04L 29/06* | (2006.01) |
| *H04W 12/03* | (2021.01) |
| *H04W 8/20* | (2009.01) |
| *H04W 12/10* | (2021.01) |
| *H04W 12/041* | (2021.01) |

(52) U.S. Cl.
CPC ........... *H04W 12/03* (2021.01); *H04L 63/061* (2013.01); *H04L 63/205* (2013.01); *H04W 8/20* (2013.01); *H04W 12/10* (2013.01); *H04W 12/041* (2021.01)

(58) Field of Classification Search
None
See application file for complete search history.

(56) References Cited

U.S. PATENT DOCUMENTS

| | | | |
|---|---|---|---|
| 7,506,370 B2 * | 3/2009 | Aggarwal | ............ H04W 12/50 726/14 |
| 8,438,389 B2 * | 5/2013 | Yao | ................... H04L 65/1053 713/168 |

(Continued)

FOREIGN PATENT DOCUMENTS

| | | |
|---|---|---|
| CN | 102257851 A | 11/2011 |
| CN | 102630376 A | 8/2012 |

(Continued)

OTHER PUBLICATIONS

3rd Generation Partnership Project, Technical Specification Group Services and System Aspects, Study on the security aspects of the next generation system (Release 14), 3GPP Standard, 3GPP TR 33.899, vol. SA WG3, No. V0.6.0, XP051229844, Nov. 25, 2016, 375 pages.

(Continued)

*Primary Examiner* — Maung T Lwin
(74) *Attorney, Agent, or Firm* — Fish & Richardson P.C.

(57) ABSTRACT

The present disclosure relates to methods, apparatus, and systems for protecting data in a communications system. One example method includes obtaining, by a core network node, information associated with a service of a terminal device, and determining, by the core network node and based on the information associated with the service, a network node that is to perform security protection on data of the service.

20 Claims, 16 Drawing Sheets

(56) References Cited

U.S. PATENT DOCUMENTS

| | | | |
|---|---|---|---|
| 2007/0249352 A1* | 10/2007 | Song | H04L 63/08 |
| | | | 455/436 |
| 2008/0076392 A1* | 3/2008 | Khetawat | H04L 63/123 |
| | | | 455/411 |
| 2008/0076425 A1* | 3/2008 | Khetawat | H04W 12/1202 |
| | | | 455/436 |
| 2011/0255510 A1 | 10/2011 | Rydnell et al. | |
| 2012/0066737 A1* | 3/2012 | Zhang | H04W 12/02 |
| | | | 726/1 |
| 2015/0249921 A1* | 9/2015 | Lv | H04W 12/062 |
| | | | 726/4 |
| 2016/0127897 A1* | 5/2016 | Lee | H04W 12/04 |
| | | | 713/176 |
| 2016/0309379 A1* | 10/2016 | Pelletier | H04W 76/12 |
| 2016/0344635 A1* | 11/2016 | Lee | H04L 47/20 |
| 2016/0353511 A1* | 12/2016 | Gunnarsson | H04W 12/108 |
| 2017/0111339 A1* | 4/2017 | Lee | H04W 12/069 |
| 2017/0311290 A1* | 10/2017 | Adjakple | H04W 4/06 |
| 2018/0213403 A1* | 7/2018 | Shi | H04W 12/06 |

FOREIGN PATENT DOCUMENTS

| | | |
|---|---|---|
| CN | 103248521 A | 8/2013 |
| CN | 10388890 A | 6/2014 |

OTHER PUBLICATIONS

Huawei Hisilicon, "Definition and Clarification for Security Policy Control Function", 3GPP Draft; S3-161987, vol. SA WG3, XP051200231, Nov. 14, 2016, 5 pages.

Huawei et al., "PCR of User Plane Security Protection", 3GPP Draft; S3-161002, vol. SA WG3, No. Chennai, India, Jul. 25-29, 2016, XP051122019, 12 pages.

Extended European Search Report issued in European Application No. 17894055.7 dated Nov. 21, 2019, 11 pages.

PCT International Search Report and Written Opinion in International Application No. PCT/CN2017/072,782, dated Jul. 6, 2017, 17 pages (With English Translation).

BlackBerry, "Key Issue 1.3 User plane integrity between UE and network," 3GPP TSG SA WG3 (Security) NextGen Ad Hoc, S3-161307, San Diego, USA, Sep. 27-29, 2016, 3 pages.

Office Action issued in Chinese Application No. 201780074415.5 dated Jul. 24, 2020, 21 pages (with English translation).

3GPP TR 23.799 V14.0.0 (Dec. 2016), "3rd Generation Partnership Project; Technical Specification Group Services and System Aspects; Study on Architecture for Next Generation System(Release 14)," Dec. 2016, 522 pages.

Office Action issued in Chinese Application No. 201780074415.5 dated Nov. 30, 2020, 6 pages (machine translation).

* cited by examiner

METHOD, APPARATUS, AND SYSTEM FOR PROTECTING DATA

CROSS-REFERENCE TO RELATED APPLICATIONS

This application is a continuation of International Application No. PCT/CN2017/072782, filed on Jan. 26, 2017, the disclosure of which is hereby incorporated by reference in its entirety.

TECHNICAL FIELD

The present disclosure relates to a communications field, and in particular, to a method, an apparatus, and a system for protecting data.

BACKGROUND

In a long term evolution (LTE for short) system, to ensure security of data transmission, a base station (evolved node-B, eNB) performs security protection such as encryption protection or integrity protection on downlink data of a service of a terminal device, and sends the security-protected downlink data to the terminal device by using an air interface between the base station and the terminal device; and correspondingly, the terminal device performs security protection on uplink data of the service, and sends the security-protected uplink data to the base station by using the air interface. During transmission over the air interface, the security-protected data is in a security-protected state. This can effectively prevent an attacker from thieving the data.

However, with evolution of the 3GPP standards, network structures and security requirements of communications systems change constantly. Therefore, data security protection needs to be further optimized.

SUMMARY

Embodiments of the present disclosure provide a method, an apparatus, and a system for protecting data in a communications system to flexibly select a network node to perform security protection, thereby satisfying a security requirement of an operator or a service and enhancing network security.

According to a first aspect, a method for protecting data in a communications system is provided and includes: obtaining, by a core network node, information associated with a service of a terminal device; and determining, by the core network node based on the information associated with the service, a network node that is to perform security protection on data of the service. According to the method, different network nodes can be flexibly selected to perform security protection on different services, and therefore a security requirement of an operator or a service can be satisfied.

With reference to the first aspect, in a first implementation of the first aspect, the determining, by the core network node based on the information associated with the service, a network node that is to perform security protection on data of the service includes: determining, by the core network node, the network node based on a security capability of a user plane function UPF node connected to the core network node and the information associated with the service; or determining, by the core network node, the network node based on a correspondence between the information associated with the service and the network node that is to perform security protection.

With reference to the first aspect or the first implementation of the first aspect, in a second implementation of the first aspect, the obtaining, by a core network node, information associated with a service of a terminal device includes: receiving, by the core network node, a request message from the terminal device, where the request message is used to request to set up a session for the service, and the request message includes the information associated with the service; or obtaining, by the core network node based on slice information associated with the core network node, the information associated with the service.

With reference to the first aspect or any implementation of the first aspect, in a third implementation of the first aspect, the network node is the UPF node, and the method further includes: sending, by the core network node, security-related parameters to the UPF node.

With reference to the third implementation of the first aspect, in a fourth implementation of the first aspect, the security-related parameters include a user plane root key $K_{up}$, a security capability of the terminal device, and a security policy of the UPF node.

With reference to the third implementation of the first aspect or the fourth implementation of the first aspect, in a fifth implementation of the first aspect, the core network node indicates a user plane UP security protection mode of the data of the service to the UPF node, where the UP security protection mode includes at least one of encryption protection and integrity protection; or the core network node indicates, to the UPF node, that the network node is the UPF node.

With reference to the first aspect or any implementation of the first aspect, in a sixth implementation of the first aspect, the security capability of the terminal device includes only an encryption capability of the terminal device; or the security capability of the terminal device includes only an integrity protection capability of the terminal device; or the security capability of the terminal device includes an encryption capability of the terminal device and an integrity protection capability of the terminal device.

With reference to the first aspect or any implementation of the first aspect, in a seventh implementation of the first aspect, the core network node is a session management function SMF node, and the SMF node receives a UP security algorithm from the UPF node.

With reference to the first aspect, or the first implementation of the first aspect, or the second implementation of the first aspect, in an eighth implementation of the first aspect, the network node is the UPF node, the core network node is an SMF node, and the SMF node determines a UP security algorithm based on a security capability of the terminal device and the security capability of the UPF node; the SMF node obtains a security key based on the UP security algorithm, $K_{up}$, and a security policy of the UPF node; and the SMF node sends the UP security algorithm, the security key, and an identifier associated with the service to the UPF node.

With reference to the seventh implementation of the first aspect or the eighth implementation of the first aspect, in a ninth implementation of the first aspect, the SMF node sends the UP security algorithm to the terminal device.

With reference to the ninth implementation of the first aspect, in a tenth implementation of the first aspect, the SMF node instructs the UPF node to perform security protection on the data of the service.

With reference to the ninth implementation of the first aspect or the tenth implementation of the first aspect, in an eleventh implementation of the first aspect, the SMF node indicates a UP security protection mode of the data of the service to the terminal device, where the UP security protection mode includes at least one of encryption protection and integrity protection.

With reference to the first aspect or any implementation of the first aspect, in a twelfth implementation of the first aspect, the core network node sends a security policy of an access network node and the identifier associated with the service to the access network node.

With reference to the twelfth implementation of the first aspect, in a thirteenth implementation of the first aspect, the core network node indicates, to the access network node, that the network node is not the access network node; or the core network node indicates, to the access network node, that the network node is the UPF node; or the core network node indicates the UP security protection mode of the data of the service to the access network node.

With reference to the first aspect, or the first implementation of the first aspect, or the second implementation of the first aspect, in a fourteenth implementation of the first aspect, the network node is an access network node, and the core network node sends a security policy of the access network node and an identifier associated with the service to the access network node; and the core network node indicates, to the access network node, that the network node is the access network node, or the core network node indicates, to the access network node, that the network node is not the UPF node.

With reference to the fourteenth implementation of the first aspect, in a fifteenth implementation of the first aspect, the core network node instructs the UPF node serving the terminal device not to perform security protection on the data of the service; or the core network node indicates, to the UPF node serving the terminal device, that the network node is not the UPF node; or the core network node indicates, to the UPF node serving the terminal device, that the network node is the access network node.

According to a second aspect, a method for protecting data in a communications system is provided and includes: receiving, by a UPF node from a core network node, information about a network node that is to perform security protection on data of a service of a terminal device or information about a security protection mode; and determining, by the UPF node based on the information about the network node or the information about the security protection mode, whether to perform security protection on the data of the service. According to the method, the UPF node can flexibly perform security protection on the service of the terminal device based on the indication about the network node to satisfy a security requirement of an operator or the service.

With reference to the second aspect, in a first implementation of the second aspect, the information about the network node includes: the network node that is to perform security protection on the data of the service is an access network node; or the network node that is to perform security protection on the data of the service is not an access network node; or the network node that is to perform security protection on the data of the service is not the UPF node; or the network node that is to perform security protection on the data of the service is the UPF node.

With reference to the second aspect, in a second implementation of the second aspect, the information about the security protection mode includes a user plane UP security protection mode of the data of the service, and the UP security protection mode includes at least one of encryption protection and integrity protection.

With reference to the second aspect or any implementation of the second aspect, in a third implementation of the second aspect, when determining to perform security protection on the data of the service of the terminal device, the method further includes: obtaining, by the UPF node, a security capability of the terminal device, a user plane root key $K_{up}$, and a security policy of the UPF node; determining, by the UPF node, a UP security algorithm based on the security capability of the terminal device and a security capability of the UPF node; and obtaining, by the UPF node, a security key based on the UP security algorithm, the $K_{up}$, and the security policy of the UPF node.

With reference to the third implementation of the second aspect, in a fourth implementation of the second aspect, the determining, by the UPF node, a user plane UP security algorithm based on the security capability of the terminal device and a security capability of the UPF node includes: when the security capability of the terminal device includes only an encryption capability of the terminal device, determining, by the UPF node, an encryption algorithm based on the encryption capability of the terminal device and an encryption capability of the UPF node; or when the security capability of the terminal device includes only an integrity protection capability of the terminal device, determining, by the UPF node, an integrity protection algorithm based on the integrity protection capability of the terminal device and an integrity protection capability of the UPF node; or when the security capability of the terminal device includes an encryption capability of the terminal device and an integrity protection capability of the terminal device, determining, by the UPF node, an encryption algorithm and an integrity protection algorithm based on the security capability of the terminal device and the security capability of the UPF node.

With reference to the third implementation of the second aspect, in a fifth implementation of the second aspect, the information about the security protection mode includes the UP security protection mode, and the determining, by the UPF node, a UP security algorithm based on the security capability of the terminal device and a security capability of the UPF node includes: determining, by the UPF node, the UP security algorithm based on the UP security protection mode, the security capability of the terminal device, and the security capability of the UPF node.

With reference to the fifth implementation of the second aspect, in a sixth implementation of the second aspect, the determining, by the UPF node, the UP security algorithm based on the UP security protection mode, the security capability of the terminal device, and the security capability of the UPF node includes: when the UP security protection mode is encryption protection, determining, by the UPF node, an encryption algorithm based on an encryption capability of the terminal device and an encryption capability of the UPF node; or when the UP security protection mode is integrity protection, determining, by the UPF node, an integrity protection algorithm based on an integrity protection capability of the terminal device and an integrity protection capability of the UPF node; or when the UP security protection mode is encryption protection and integrity protection, determining, by the UPF node, an encryption algorithm and an integrity protection algorithm based on the security capability of the terminal device and the security capability of the UPF node.

With reference to the second aspect or any implementation of the second aspect, in a seventh implementation of the second aspect, the UPF node sends the UP security algorithm to the terminal device.

With reference to the second aspect or any implementation of the second aspect, in an eighth implementation of the second aspect, the core network node is a session management function SMF node, and the method further includes: performing, by the UPF node, security protection on the data of the service based on the security key, the UP security algorithm, and an identifier associated with the service.

According to a third aspect, a method for protecting data in a communications system is provided and the method includes: obtaining, by an access network node, information associated with a service of a terminal device; and determining, by the access network node based on the information associated with the service, whether to perform security protection on data of the service. According to the method, the access network node can independently determine whether the access network node is to perform security protection. Therefore, security protection by the access network node and security protection by a UPF node are decoupled, and network security performance is enhanced.

With reference to the third aspect, in a first implementation of the third aspect, the determining, by the access network node based on the information associated with the service, whether to perform security protection on data of the service includes: determining, by the access network node based on the information associated with the service and information indicated by a core network node, whether to perform security protection on the data of the service, where
the indicated information includes: a network node that is to perform security protection on the data of the service is the access network node; or a network node that is to perform security protection on the data of the service is not the access network node; or a network node that is to perform security protection on the data of the service is not a user plane function UPF node; or a network node that is to perform security protection on the data of the service is a UPF node; or a user plane UP security protection mode of the data of the service, where the UP security protection mode includes at least one of encryption protection and integrity protection.

With reference to the third aspect or the first implementation of the third aspect, in a second implementation of the third aspect, when determining to perform security protection on the data of the service, the method further includes: indicating, by the access network node to the terminal device, that the access network node is to perform security protection on the data of the service; or indicating, by the access network node, an access stratum AS security protection mode of the data of the service to the terminal device, where the AS security protection mode includes at least one of encryption protection and integrity protection.

With reference to the second implementation of the third aspect, in a third implementation of the third aspect, the access network node obtains a security capability of the terminal device, a security policy of the access network node, and an identifier associated with the service; the access network node determines an AS security algorithm based on the security capability of the terminal device and a security capability of the access network node; the access network node obtains a security key based on the security policy of the access network node, the AS security algorithm, and an access network key $K_{an}$; and the access network node sends the AS security algorithm and the identifier associated with the service to the terminal device.

With reference to the third implementation of the third aspect, in a fourth implementation of the third aspect, the access network node performs security protection on the data of the service based on the AS security algorithm, the security key, and the identifier associated with the service.

With reference to the third aspect or the first implementation of the third aspect, in a fifth implementation of the third aspect, when determining not to perform security protection on the data of the service, the method further includes: indicating, by the access network node to the terminal device, that the access network node is not to perform security protection on the data of the service.

According to a fourth aspect, a method for protecting data in a communications system is provided and the method includes: receiving, by a terminal device from an access network node, an access stratum AS security algorithm and an identifier associated with a service of the terminal device; obtaining, by the terminal device, a first security key based on the AS security algorithm, an access network key $K_{an}$, and an AS security protection mode that is of data of the service and is indicated by the access network node, where the AS security protection mode includes at least one of encryption protection and integrity protection; and performing, by the terminal device, security protection on the data of the service based on the first security key, the AS security algorithm, and the identifier associated with the service. According to the method, successful decoupling between security protection by a UPF node and security protection by the access network node can be ensured, and security performance is enhanced.

According to a fifth aspect, a method for protecting data in a communications system is provided and the method includes: receiving, by a terminal device from an access network node, an access stratum AS security algorithm and an identifier associated with a service of the terminal device; when the access network node indicates that the access network node is to perform security protection on data of the service, obtaining, by the terminal device, a first security key based on the AS security algorithm and an access network key $K_{an}$; and performing, by the terminal device, security protection on the data of the service based on the first security key, the AS security algorithm, and the identifier associated with the service. According to the method, security protection by a UPF node and security protection by the access network node can be successfully decoupled, and security performance is enhanced.

With reference to the fourth aspect or the fifth aspect, in a possible implementation, the method further includes: receiving, by the terminal device, a user plane UP security algorithm from a core network node; and obtaining, by the terminal device, a second security key based on the UP security algorithm and a user plane root key $K_{up}$.

With reference to any implementation of the fourth aspect or the fifth aspect, in another possible implementation, the obtaining, by the terminal device, a second security key based on the UP security algorithm and $K_{up}$ includes: obtaining, by the terminal device, the second security key based on the UP security algorithm, the $K_{up}$, and a UP security protection mode that is of the data of the service and is indicated by the core network node, where the UP security protection mode includes at least one of encryption protection and integrity protection.

According to a sixth aspect, a core network node is provided and includes a unit or means configured to perform each step of any method in the first aspect.

According to a seventh aspect, a core network node is provided and includes a processor and a memory, where the memory is configured to store a program, and the processor invokes the program stored in the memory to perform any method in the first aspect.

According to an eighth aspect, a core network node is provided and includes at least one processing element or at least one chip configured to perform any method in the first aspect.

According to a ninth aspect, a program is provided, where when the program is executed by a processor, the program is used to perform any method in the first aspect.

According to a tenth aspect, a computer-readable storage medium is provided and includes the program in the ninth aspect.

According to an eleventh aspect, a user plane function UPF node is provided and includes a unit or means configured to perform each step of any method in the second aspect.

According to a twelfth aspect, a UPF node is provided and includes a processor and a memory, where the memory is configured to store a program, and the processor invokes the program stored in the memory to perform any method in the second aspect.

According to a thirteenth aspect, a UPF node is provided and includes at least one processing element or at least one chip configured to perform any method in the second aspect.

According to a fourteenth aspect, a program is provided, where when the program is executed by a processor, the program is used to perform any method in the second aspect.

According to a fifteenth aspect, a computer-readable storage medium is provided and includes the program in the fourteenth aspect.

According to a sixteenth aspect, an access network node is provided and includes a unit or means configured to perform each step of any method in the third aspect.

According to a seventeenth aspect, an access network node is provided and includes a processor and a memory, where the memory is configured to store a program, and the processor invokes the program stored in the memory to perform any method in the third aspect.

According to an eighteenth aspect, an access network node is provided and includes at least one processing element or at least one chip configured to perform any method in the third aspect.

According to a nineteenth aspect, a program is provided, where when the program is executed by a processor, the program is used to perform any method in the third aspect.

According to a twentieth aspect, a computer-readable storage medium is provided and includes the program in the nineteenth aspect.

According to a twenty-first aspect, a terminal device is provided and includes a unit or means configured to perform each step of any method in the fourth aspect or the fifth aspect.

According to a twenty-second aspect, a terminal device is provided and includes a processor and a memory, where the memory is configured to store a program, and the processor invokes the program stored in the memory to perform any method in the fourth aspect or the fifth aspect.

According to a twenty-third aspect, a terminal device is provided and includes at least one processing element or at least one chip configured to perform any method in the fourth aspect or the fifth aspect.

According to a twenty-fourth aspect, a program is provided, where when the program is executed by a processor, the program is used to perform any method in the fourth aspect or the fifth aspect.

According to a twenty-fifth aspect, a computer-readable storage medium is provided and includes the program in the twenty-fourth aspect.

DESCRIPTION OF DRAWINGS

To describe the technical solutions in the embodiments of the present disclosure more clearly, the following briefly describes the accompanying drawings required for describing the embodiments. Apparently, the accompanying drawings in the following description show some embodiments of the present disclosure, and a person of ordinary skill in the art may derive other drawings from these accompanying drawings without creative efforts.

DESCRIPTION OF EMBODIMENTS

Figure 1:
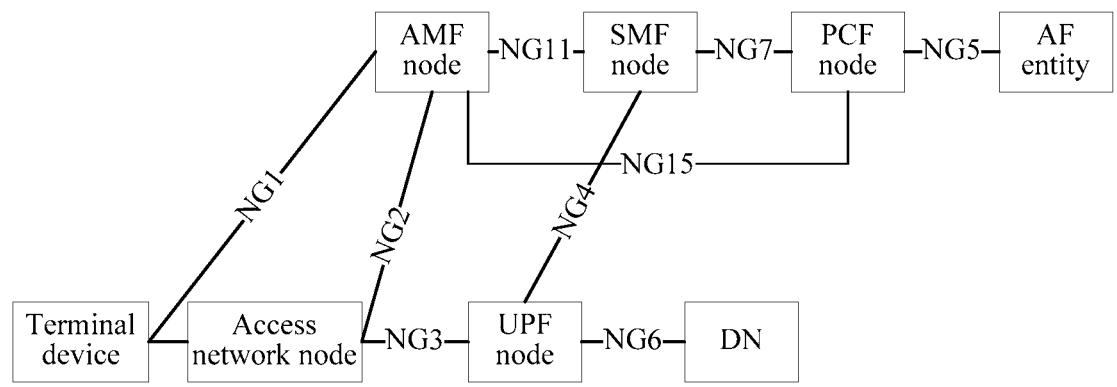
FIG. 1 is a structural diagram of a network.

The following describes the technical solutions in the embodiments of the present disclosure with reference to the accompanying drawings in the embodiments of the present disclosure. FIG. 1 provides a network structure, where the network structure may be applied to a next-generation communications system. The following briefly describes each component in the network structure.

Terminal devices may include various handheld devices, in-vehicle devices, wearable devices, and computing devices having wireless communication functions, or other processing devices connected to a wireless modem, and terminals, mobile stations (MS), terminals (terminal), user equipment (UE), software terminals, and the like in various forms, for example, a water meter, an electricity meter, and a sensor.

An access network node is similar to a base station in a conventional network. It provides a network access function for an authorized user in a specified area, and can use transmission tunnels of different quality based on user levels, service requirements, and the like. The access network node can manage radio resources, provide an access service for a terminal device, and further complete forwarding of a control signal and user data between the terminal device and a core network.

An access and mobility management function (AMF) node is responsible for mobility management, access management, and the like, and may be configured to implement other functions than session management in functions of a mobility management entity (MME).

A session management function (SMF) node sets up a session for the terminal device, allocates a session identifier (ID), and manages or terminates the session.

A user plane function (UPF) node provides functions such as session and bearer management and IP address allocation.

A policy control function (PCF) node allocates a security policy to a network entity, for example, an access network node or a UPF node.

A data network (DN) provides an external data network service.

An application function (AF) entity provides an application layer service.

As shown in FIG. 1, the foregoing components communicate with each other by using a next-generation (NG) path. For example, the access network node communicates with the UPF node by using an NG3 path. In addition, the SMF node and the AMF node may be integrated in one physical device, or may be distributed on different physical devices. This is not specifically limited in this application.

Figure 2:
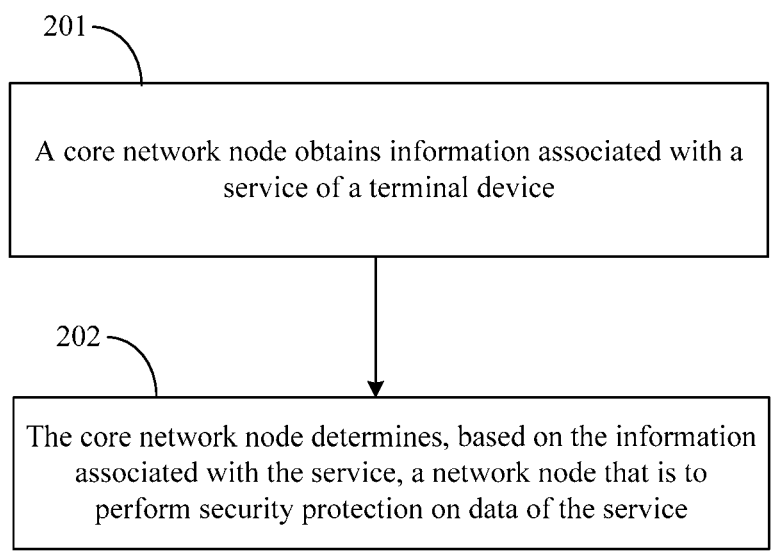
FIG. 2 is a flowchart of a method for protecting data according to an embodiment of the present disclosure.

As shown in FIG. 2, an embodiment of the present disclosure provides a method for protecting data, where the method is performed by a core network node, and the core network node may be an SMF node or an AMF node. The following describes the method in detail.

201. A core network node obtains information associated with a service of a terminal device.

The service of the terminal device may be an Internet of Things (internet of things, IOT) service, a voice service, or an Internet of Vehicles service, and is not limited.

Further, the information associated with the service may include service type information, slice type information, access point name (APN) information, DN name information, or other information that may represent the service of the terminal device.

For example, the core network node may obtain, in the following manner, the information associated with the service of the terminal device:

Manner 1: The core network node receives a request message sent by the terminal device, where the request message is used to request to set up a session for the service, and the request message includes the information associated with the service. The request message may be a session setup request message.

Manner 2: The core network node obtains, based on slice information of the core network node, the information associated with the service.

In this embodiment of the present disclosure, based on a group of technologies such as cloud computing, virtualization, software-defined networking, and a distributed cloud architecture and by using unified orchestration at an upper layer, a slice may enable a network to have capabilities of management and coordination, to simultaneously support functions of a plurality of logical networks based on a general-purpose physical network infrastructure platform. Each slice has the following features. For example, the slice provides a same type of service, or is used by a same tenant. The slice information of the core network node may include a slice type, and the slice type may be a type of service provided by a slice to which the core network node belongs. The slice information of the core network node may also include tenant information.

202. The core network node determines, based on the information associated with the service, a network node that is to perform security protection on data of the service.

The network node may be a specific network node, for example, an access network node serving the terminal device or a UPF node serving the terminal device. Alternatively, the network node may be a type of network node. For example, when there are a plurality of UPF nodes, that the network node is a UPF node does not mean that security protection is to be performed by a UPF node, but means that security protection is to be performed in a UPF node position.

For example, step 202 may be implemented in the following manner:

Manner 1: The core network node determines the network node based on security capabilities of UPF nodes connected to the core network node, and the information associated with the service.

A security capability of a UPF node may include at least one of an encryption capability and an integrity protection capability.

Further, the encryption capability may include an encryption algorithm supported by the UPF node, a priority of the encryption algorithm, and the like. The integrity protection capability includes an integrity protection algorithm supported by the UPF node, a priority of the integrity protection algorithm, and the like.

For example, the core network node may obtain, based on a correspondence between the information associated with the service and a security capability requirement, the security capability requirement corresponding to the information associated with the service, where the security capability requirement may be a security capability priority. A UPF node whose security capability priority satisfies the security capability requirement is selected from the UPF nodes connected to the core network node, as the network node. For example, a UPF node whose security capability priority is higher than or equal to the security capability requirement is selected as the network node.

In an example, assuming that the security capability requirement corresponding to the information associated with the service is a 128-bit (bit) encryption algorithm, and that a priority of the encryption algorithm is a level 5, a UPF node that supports the 128-bit encryption algorithm and whose encryption algorithm priority is the level 5 is selected from the UPF nodes connected to the core network node.

Obviously, a UPF node whose security capability priority is higher than the security capability requirement may also be selected, and this is not limited herein.

In this embodiment of the present disclosure, when at least two of the UPF nodes connected to the core network node satisfy the security capability requirement, a UPF node may be selected as the network node based on at least one of status parameters and security capability priorities of the at least two UPF nodes, or a UPF node may be randomly selected as the network node. The status parameters may include load, an operation capability, and the like.

For example, a UPF node whose security capability priority is the highest is selected from the at least two UPF nodes as the network node, or a UPF node is randomly selected from the at least two UPF nodes as the network node.

Manner 2: The core network node determines the network node based on a correspondence between the information associated with the service and the network node that is to perform security protection.

In an example, assuming that the information associated with the service is the service type information or the slice type information, for example, the voice service, and that the correspondence is a correspondence between the voice service and a UPF node, the network node is the UPF node.

The correspondence in the manner 2 may be received from a third-party application or a third-party server, or may be configured on the core network node by an operator by using a communications interface. This is not limited.

In this embodiment of the present disclosure, when at least two UPF nodes are connected to the core network node, a UPF node may be selected as the network node based on at least one of status parameters and security capability priorities of the at least two UPF nodes, or a UPF node may be randomly selected as the network node. For detailed descriptions, refer to the manner 1. Details are not described again.

In addition, the manner 1 and the manner 2 may be used in combination to determine the network node. Details are not described again.

According to the method provided in the foregoing embodiment, the core network node obtains the information associated with the service of the terminal device, and determines, based on the information associated with the service, the network node that is to perform security protection on the data of the service. Therefore, different network nodes can be flexibly selected to perform security protection on different services, and therefore a security requirement of the operator or the service can be satisfied. For example, a UPF node may perform security protection on data of a banking service, and this greatly enhances security.

Optionally, in a first implementation scenario of the foregoing embodiment, the network node is the UPF node, and the method further includes at least one of step 203 and step 204.

203. The core network node sends security-related parameters to the UPF node.

The security-related parameters may include at least one of a user plane root key $K_{up}$, a security capability of the terminal device, and a security policy of the UPF node. The security policy of the UPF node may be used to indicate a length of a security key used by the UPF node, for example, 128 bits or 256 bits.

In this embodiment of the present disclosure, the security policy of the UPF node may correspond to the information associated with the service. To be specific, information associated with different services may correspond to security policies of different UPF nodes. For example, when the service is the Internet of Vehicles service, the UPF node may use a 128-bit security key. In addition, the security policy of the UPF node may be stored on the core network node, or may be obtained from a PCF node. This is not limited herein.

The security capability of the terminal device may include only an encryption capability; or the security capability of the terminal device includes only an integrity protection capability; or the security capability of the terminal device includes an encryption capability and an integrity protection capability.

204. The core network node indicates a UP security protection mode of the data of the service to the UPF node, or the core network node indicates, to the UPF node, that the network node is the UPF node.

The UP security protection mode may include at least one of encryption protection and integrity protection.

In an example, the UP security protection mode may be determined by the core network node based on a correspondence between the information associated with the service and the security protection mode. For example, the voice service corresponds to encryption protection, and the Internet of Vehicles service corresponds to integrity protection.

In addition, the UP security protection mode may be determined in step 202. To be specific, the network node may also be determined based on the security protection mode supported by the network node.

For example, the UP security protection mode may be indicated by using two bits. For example, 01 indicates encryption protection, 10 indicates integrity protection, and 11 indicates encryption protection and integrity protection.

That the core network node indicates, to the UPF node, that the network node is the UPF node means that the core network node instructs the UPF node to enable or start or enable or activate security protection of the UPF node, where the security protection is intended for the data of the service.

In an example, the core network node may indicate, to the UPF node in a manner of sending indication information, that the network node is the UPF node. For example, one bit is used; and when a value of the bit is 1, it indicates that the network node that is to perform security protection on the data of the service is the UPF node; or when a value of the bit is 0, it indicates that the network node is not the UPF node, or indicates that the network node is the access network node.

In this embodiment of the present disclosure, when the method includes steps 203 and 204, the two steps may be implemented separately, or may be implemented by one action. For example, the manner of indication information is used in step 204. To be specific, the indication information is used to indicate the UP security protection mode or indicate that the network node is the UPF node. In this case, the security-related parameters in step 203 and the indication information may be carried in a same message and sent to the UPF node, where the message may be a session setup message.

Optionally, when the core network node is an SMF node, the method further includes:

205. The SMF node receives a UP security algorithm from the UPF node.

The UP security algorithm may be carried in a session setup response message.

Further, the method may further include:

the SMF node sends the UP security algorithm to the terminal device.

The UP security algorithm may be carried in a security mode command (SMC), or may be carried in a non-access stratum (NAS) message.

Optionally, in a second implementation scenario of the foregoing embodiment, the network node is the UPF node, the core network node is an SMF node, and the method further includes:

203a. The SMF node determines a UP security algorithm based on a security capability of the terminal device and a security capability of the UPF node.

The UP security algorithm may include at least one of an encryption algorithm and an integrity protection algorithm, and is used by the UPF node to perform security protection on the data of the service.

For example, the SMF node may select a security algorithm supported by the terminal device from security algorithms supported by the UPF node, as the UP security algorithm. For another example, when at least two security algorithms supported by the terminal device exist in security algorithms supported by the UPF node, a security algorithm of a highest priority may be selected as the UP security algorithm.

204a. The SMF node obtains a security key based on the UP security algorithm, $K_{up}$, and a security policy of the UPF node.

The security key is used by the UPF node to perform security protection on the data of the service, and may include at least one of an encryption key and an integrity protection key, for example, an integrity key $K_{upfint}$ and/or an encryption key $K_{upfenc}$.

For example, the SMF node may derive a 256-bit security key based on the UP security algorithm and $K_{up}$; and the SMF node performs truncating processing on the derived security key based on the security policy of the UPF node.

In an example, assuming that the security policy of the UPF node indicates that the UPF node uses a 128-bit security key, the SMF node uses first 128 bits in the derived security key as the security key in step 204a, namely, a security key of the UPF node.

205a. The SMF node sends the UP security algorithm, the security key, and an identifier associated with the service to the UPF node.

The identifier associated with the service may indicate a path used for transmitting the data of the service between the terminal device and the UPF node. For example, it is a session identifier or a bearer identifier.

Optionally, the method may further include:
the SMF node sends the UP security algorithm to the terminal device.

Further, the method may further include:
the SMF node instructs the UPF node to perform security protection on the data of the service.

Further, the method may further include:
the SMF node indicates a UP security protection mode of the data of the service to the terminal device.

For the UP security protection mode, refer to related descriptions in step 204. Details are not described again.

Optionally, with reference to the first implementation scenario or the second implementation scenario, the method further includes at least one of steps 206 and 207.

206. The core network node sends a security policy of the access network node and the identifier associated with the service to the access network node.

The security policy of the access network node may be used to indicate a security key length of the access network node. Alternatively, the security policy of the access network node may be stored on the core network node, or obtained from the PCF node.

In addition, the security policy of the access network node is similar to the security policy of the UPF node, and may correspond to the information associated with the service.

207. The core network node indicates, to the access network node, that the network node is not the access network node; or the core network node indicates, to the access network node, that the network node is the UPF node; or the core network node indicates the UP security protection mode of the data of the service to the access network node.

The core network node may indicate, to the access network node in a manner of sending indication information, that the network node is not the access network node, or that the network node is the UPF node. For example, one bit is used; and when a value of the bit is 1, it indicates that the network node is the UPF node, or indicates that the network node is not the access network node; or when a value of the bit is 0, it indicates that the network node is not the UPF node, or indicates that the network node is the access network node.

In addition, that the core network node indicates the UP security protection mode of the data of the service to the access network node in step 207 may be implemented in the manner in step 204. For example, the UP security protection mode is indicated by using two bits. For example, 01 indicates encryption protection, 10 indicates integrity protection, and 11 indicates encryption protection and integrity protection. In this case, the core network node sends the two bits to the access network node, to indicate the UP security protection mode of the data of the service.

In this embodiment of the present disclosure, when the method includes steps 206 and 207, the two steps may be implemented separately, or may be implemented by one action. For example, the manner of indication information is used in step 207. To be specific, the indication information is used to indicate the UP security protection mode or indicate that the network node is the UPF node or indicate that the network node is not the access network node. In this case, the security policy of the access network node and the identifier associated with the service in step 206, and the indication information may be carried in a same message and sent to the access network node.

In a third implementation scenario of the foregoing embodiment, the network node is the access network node, and the method further includes at least one of step 204b and step 205b.

204b. The core network node sends a security policy of the access network node and an identifier associated with the service to the access network node.

205b. The core network node indicates, to the access network node, that the network node is the access network node, or the core network node indicates, to the access network node, that the network node is not the UPF node.

Step 205b may be implemented in the manner provided in step 204. For example, a UP security protection mode may be indicated by using two bits. Details are not described again.

In this embodiment of the present disclosure, when the method includes steps 204b and 205b, the two steps may be implemented separately, or may be implemented by one action. For example, a manner of sending indication information is used in step 205b, where the indication information is used to indicate that the network node is the access network node or is not the UPF node. In this case, the security policy of the access network node and the identifier associated with the service in step 204*b*, and the indication information in step 205*b* may be carried in a same message and sent to the access network node.

Further, the method may further include:

the core network node instructs the UPF node serving the terminal device not to perform security protection on the data of the service; or the core network node indicates, to the UPF node serving the terminal device, that the network node is not the UPF node; or the core network node indicates, to the UPF node serving the terminal device, that the network node is the access network node.

The serving UPF node is a UPF node providing the service.

Figure 3:
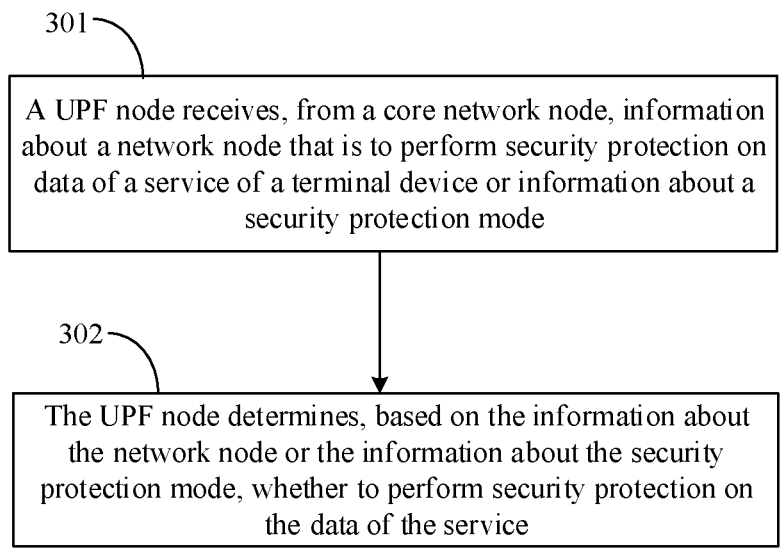
FIG. 3 is a flowchart of another method for protecting data according to an embodiment of the present disclosure.

As shown in FIG. 3, an embodiment of the present disclosure provides another method for protecting data, where the method is performed by a UPF node. The following describes the method in detail.

301. A UPF node receives, from a core network node, information about a network node that is to perform security protection on data of a service of a terminal device or information about a security protection mode.

The information about the network node may include:

the network node that is to perform security protection on the data of the service is an access network node; or the network node that is to perform security protection on the data of the service is not an access network node; or the network node that is to perform security protection on the data of the service is not the UPF node; or the network node that is to perform security protection on the data of the service is the UPF node.

The information about the security protection mode may include a UP security protection mode of the data of the service, where the UP security protection mode includes at least one of encryption protection and integrity protection. For details, refer to the related descriptions in step 207 in the embodiment shown in FIG. 2. Details are not described again.

The information about the network node and the UP security protection mode may be implemented in the manner provided in step 204. For example, the UP security protection mode may be indicated by using two bits. Details are not described again.

302. The UPF node determines, based on the information about the network node or the information about the security protection mode, whether to perform security protection on the data of the service.

For detailed descriptions about security protection, refer to the embodiment shown in FIG. 2. Details are not described again.

For example, when the information about the network node is received in step 301, that the UPF node determines, based on the information, whether to perform security protection on the data of the service may include:

when the information is used to indicate that the network node is the access network node or is not the UPF node, the UPF node does not perform security protection on the data of the service; or when the information is used to indicate that the network node is not the access network node or is the UPF node, the UPF node performs security protection on the data of the service.

For example, when the UP security protection mode is received in step 301, that the UPF node determines, based on the information, whether to perform security protection on the data of the service may include:

the UPF node performs security protection on the data of the service in a security protection mode indicated by the UP security protection mode.

In an example, the UP security protection mode indicates encryption protection, and the UPF node performs encryption protection on the data of the service.

According to the method provided in this embodiment, the UPF node receives, from the core network node, the information about the network node that is to perform security protection on the data of the service of the terminal device or the information about the security protection mode, and determines, based on the information about the network node or the information about the security protection mode, whether to perform security protection on the data of the service. Therefore, the UPF node can flexibly perform security protection on the service of the terminal device based on the indication about the network node to satisfy a security requirement of an operator or the service.

Optionally, in an implementation scenario, when determining to perform security protection on the data of the service of the terminal device, or before the UPF node performs security protection on the data of the service, the method may further include the following steps 303 to 305.

303. The UPF node obtains a security capability of the terminal device, $K_{up}$, and a security policy of the UPF node.

The security capability of the terminal device may be obtained from the core network node. For example, the security capability of the terminal device that is sent by an SMF node or an AMF node is received. Alternatively, the security capability of the terminal device may be obtained from another network-side node and stored on the UPF node. This is not limited. For descriptions about the security capability, refer to the embodiment shown in FIG. 2. Details are not described again.

Similarly, $K_{up}$ and the security policy of the UPF node may also be obtained in the foregoing manner. In addition, for the security policy of the UPF, refer to related descriptions in the embodiment shown in FIG. 2. Details are not described again.

304. The UPF node determines a UP security algorithm based on the security capability of the terminal device and a security capability of the UPF node.

305. The UPF node obtains a security key based on the UP security algorithm, $K_{up}$, and the security policy of the UPF node.

For both steps 304 and 305, refer to steps 203*a* and 204*a* respectively in the embodiment shown in FIG. 2. Details are not described again.

Optionally, step 304 includes:

when the security capability of the terminal device includes only an encryption capability of the terminal device, the UPF node determines an encryption algorithm based on the encryption capability of the terminal device and an encryption capability of the UPF node; or when the security capability of the terminal device includes only an integrity protection capability of the terminal device, the UPF node determines an integrity protection algorithm based on the integrity protection capability of the terminal device and an integrity protection capability of the UPF node; or when the security capability of the terminal device includes an encryption capability of the terminal device and an integrity protection capability of the terminal device, the UPF node determines an encryption algorithm and an integrity protection algorithm based on the security capability of the terminal device and the security capability of the UPF node.

Optionally, the information about the security protection mode includes the UP security protection mode, and step 304 includes:

the UPF node determines the UP security algorithm based on the UP security protection mode, the security capability of the terminal device, and the security capability of the UPF node.

For example, when the UP security protection mode is encryption protection, the UPF node determines the encryption algorithm based on the encryption capability of the terminal device and the encryption capability of the UPF node; or when the UP security protection mode is integrity protection, the UPF node determines the integrity protection algorithm based on the integrity protection capability of the terminal device and the integrity protection capability of the UPF node; or when the UP security protection mode is encryption protection and integrity protection, the UPF node determines the encryption algorithm and the integrity protection algorithm based on the security capability of the terminal device and the security capability of the UPF node.

Further, after step 305, the method further includes:

306. The UPF node sends the UP security algorithm to the terminal device.

For example, the UPF node may send the UP security algorithm to the SMF node, and the SMF node adds the UP security algorithm to an SMC or a NAS message and sends the SMC or the NAS message to the terminal device.

Further, the method may further include:

307. The UPF node performs security protection on the data of the service based on the security key and the UP security algorithm.

For example, the data of the service and the security key are input to a security algorithm, and the security algorithm outputs a ciphertext. In this way, data security protection is implemented.

The UPF node may identify the data of the service by using an identifier associated with the service or an identifier of the terminal device, where the identifier associated with the service or the identifier of the terminal device may be received from the core network node in step 301. The UPF node may perform security protection on the data of the service based on the security key, the UP security algorithm, and the identifier associated with the service.

In this embodiment of the present disclosure, when the core network node is the SMF node, the identifier associated with the service may be a session ID.

In this embodiment of the present disclosure, an execution sequence of steps 306 and 307 may be adjusted. In addition, before step 307, the method may further include: the UPF node performs security protection on the data of the service according to an instruction received from the SMF node.

Figure 4:
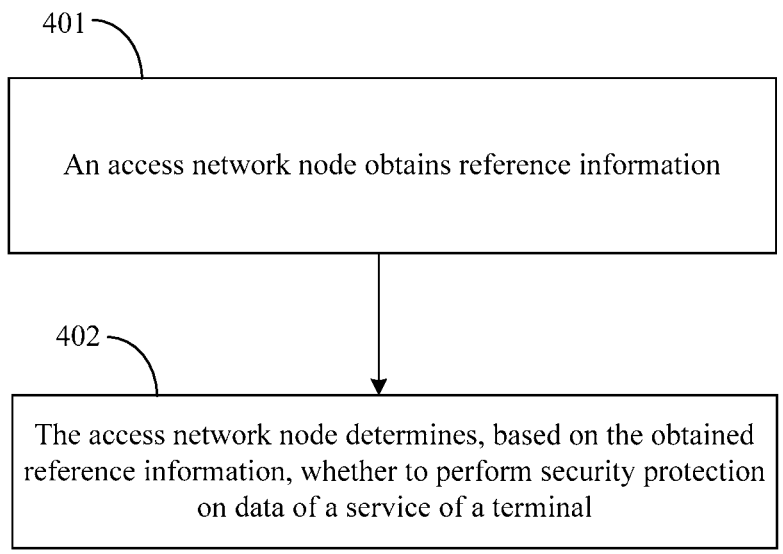
FIG. 4 is a flowchart of another method for protecting data according to an embodiment of the present disclosure.

As shown in FIG. 4, an embodiment of the present disclosure further provides a method for protecting data, where the method is performed by an access network node. The method includes the following steps.

401. An access network node obtains reference information.

402. The access network node determines, based on the obtained reference information, whether to perform security protection on data of a service of a terminal.

The reference information includes at least one of the following information: information associated with the service of the terminal device, a local policy, a policy of an operator, and information received from a core network node about a network node that is to perform security protection on the data of the service of the terminal device or information about a security protection mode.

For the information associated with the service and security protection, refer to related descriptions in the embodiment shown in FIG. 2. Details are not described again.

The local policy may be used to indicate whether the access network node performs security protection on the data of the service based on the information about the network node or the information about the security protection mode. Alternatively, the local policy may be a correspondence between the information associated with the service and the security protection mode. In an example, a voice service corresponds to encryption protection, and an Internet of Vehicles service corresponds to integrity protection. Alternatively, the local policy may be a correspondence between the information associated with the service and whether to perform security protection. In another example, security protection is performed on a voice service, but security protection is not performed on an Internet of Vehicles service.

The policy of the operator may be whether the operator allows the access network node to perform security protection, or a security protection mode that the operator allows the access network node to perform, or a security protection mode that the operator does not allow the access network node to perform. For example, the operator does not allow the access network node to perform encryption protection. The core network node may be an SMF node or an AMF node.

The information about the network node may include:
the network node that is to perform security protection on the data of the service is the access network node; or
the network node that is to perform security protection on the data of the service is not the access network node; or
the network node that is to perform security protection on the data of the service is not a UPF node; or
the network node that is to perform security protection on the data of the service is a UPF node.

The information about the security protection mode may include a UP security protection mode of the data of the service, where the UP security protection mode includes at least one of encryption protection and integrity protection. For details, refer to the related descriptions in step 207 in the embodiment shown in FIG. 2. Details are not described again.

The information about the network node and the UP security protection mode may be implemented in the manner provided in step 204 or 207. For example, the UP security protection mode may be indicated by using two bits. Details are not described again.

According to the method provided in this embodiment, the access network node obtains the reference information, and determines, based on the obtained reference information, whether to perform security protection on the data of the service of the terminal, so that the access network node can independently determine whether the access network node is to perform security protection. Therefore, security protection by the access network node and security protection by the UPF node are decoupled, and network security is enhanced.

Figure 4A:
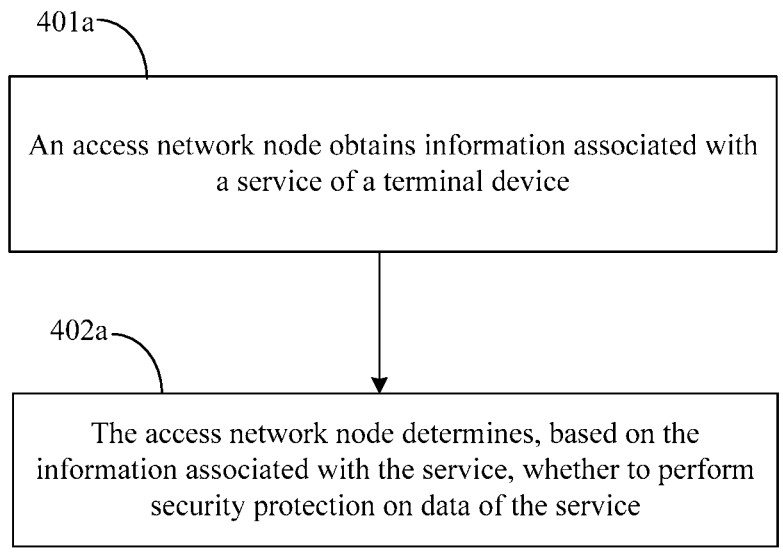
FIG. 4a is a flowchart of another method for protecting data according to an embodiment of the present disclosure.

Referring to FIG. 4a, an example in which reference information is information associated with a service of a terminal device is used in the following description.

As shown in FIG. 4a, an embodiment of the present disclosure provides another method for protecting data, where the method is performed by an access network node. Details are as follows:

401a. An access network node obtains information associated with a service of a terminal device.

The access network node may obtain the information associated with the service from the terminal device, for example, receive a message that is sent by the terminal device and carries the information associated with the service.

402a. The access network node determines, based on the information associated with the service, whether to perform security protection on data of the service.

In step 402a, the access network node may specifically determine, based on a local policy or a policy of an operator or information indicated by a core network node and the information associated with the service, whether to perform security protection on the data of the service.

In an example, assuming that the local policy is a correspondence between the information associated with the service and a security protection mode, the access network node performs, based on the information associated with the service and the local policy, security protection indicated by the security protection mode corresponding to the information associated with the service. For example, if a service type of the service is a voice service, and a security protection mode corresponding to the voice service is encryption protection, encryption protection is performed on the data of the service.

The access network node determines, based on the information associated with the service and the information indicated by the core network node, whether to perform security protection on the data of the service.

The indicated information may include:
  a network node that is to perform security protection on the data of the service is the access network node; or
  a network node that is to perform security protection on the data of the service is not the access network node; or
  a network node that is to perform security protection on the data of the service is not a UPF node; or
  a network node that is to perform security protection on the data of the service is a UPF node; or
  a UP security protection mode of the data of the service, where the UP security protection mode includes at least one of encryption protection and integrity protection.

In this embodiment of the present disclosure, the indicated information may be implemented in the manner provided in step 204 or 207. Details are not described again.

According to the method provided in this embodiment, the access network node obtains the information associated with the service of the terminal device, and determines, based on the information associated with the service, whether to perform security protection on the data of the service of the terminal, so that the access network node can independently determine whether the access network node is to perform security protection. Therefore, security protection by the access network node and security protection by the UPF node are decoupled. In addition, because whether to perform security protection is determined based on the information associated with the service, security requirements of different services can be satisfied.

Figure 4B:
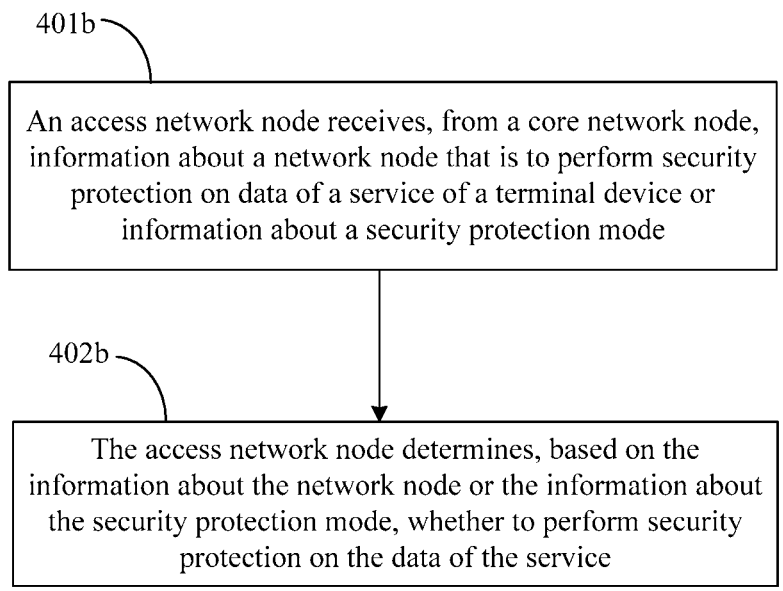
FIG. 4b is a flowchart of another method for protecting data according to an embodiment of the present disclosure.

Referring to FIG. 4b, in the following descriptions, reference information is information received from a core network node about a network node that is to perform security protection on data of a service of a terminal device or information about a security protection mode.

401b. An access network node receives, from a core network node, information about a network node that is to perform security protection on data of a service of a terminal device or information about a security protection mode.

402b. The access network node determines, based on the information about the network node or the information about the security protection mode, whether to perform security protection on the data of the service.

For example, when the information about the network node is received in step 401b, that the access network node determines, based on the information about the network node, whether to perform security protection on the data of the service may include:
  when the information about the network node is used to indicate that the network node is the access network node or is not a UPF node, the access network node performs security protection on the data of the service; or
  when the information about the network node is used to indicate that the network node is not the access network node or is a UPF node, the access network node performs security protection on the data of the service.

For the information associated with the service, refer to related descriptions in the embodiment shown in FIG. 2.

For example, when the UP security protection mode is received in step 401b, that the access network node determines, based on the information, whether to perform security protection on the data of the service may include:
  the access network node determines, based on a security protection mode indicated by the UP security protection mode, whether to perform security protection on the data of the service.

In an example, the UP security protection mode indicates encryption protection, and the access network node may perform integrity protection on the data of the service.

In the foregoing step 402b, the access network node may determine, based on the information associated with the service or a local policy or a policy of an operator, and the information about the network node, whether to perform security protection or a security protection mode to be performed. For example, if the information about the network node is used to indicate that the network node is the access network node, and a service type of the service is a voice service, the access network node determines to perform security protection on the data of the service; or if the information about the network node is used to indicate that the network node is the access network node, and a service type of the service is an Internet of Vehicles service, the access network node determines not to perform security protection on the data of the service.

According to the method provided in this embodiment, the access network node determines, based on the information sent by the core network node about the network node that is to perform security protection on the data of the service of the terminal device or the information about the security protection mode, whether to perform security protection on the data of the service of the terminal, so that the access network node can independently determine whether the access network node is to perform security protection. Therefore, security protection by the access network node and security protection by the UPF node are decoupled, and network security is enhanced. In addition, the access network node determines, by referring to security protection by the UPF node on the service, whether to perform security protection. This can compensate for a disadvantage of the UPF node in performing security protection on the service and enhance network security.

In an implementation scenario of the embodiment shown in FIG. 4 or FIG. 4a or FIG. 4b, when determining to perform security protection on the data of the service, or before performing security protection on the data of the service, the method further includes:

the access network node indicates, to the terminal device, that the access network node is to perform security protection on the data of the service; or the access network node indicates an access stratum (AS) security protection mode of the data of the service to the terminal device, where the AS security protection mode includes at least one of encryption protection and integrity protection.

Optionally, the method further includes:

the access network node obtains a security capability of the terminal device, a security policy of the access network node, and an identifier associated with the service;

the access network node determines an AS security algorithm based on the security capability of the terminal device and a security capability of the access network node;

the access network node obtains a security key based on the security policy of the access network node, the AS security algorithm, and an access network key $K_{an}$; and the access network node sends the AS security algorithm and the identifier associated with the service to the terminal device.

The security capability of the terminal device may be obtained from the terminal device, or may be sent by the core network node to the access network node. The security policy of the access network node may be used to indicate a length of the security key used by the access network node. The security policy of the access network node may correspond to the service. To be specific, different services correspond to security policies of different access network nodes. The security policy may be obtained from the core network node, or may be stored on the access network node.

In addition, for the identifier associated with the service, refer to related descriptions in the embodiment shown in FIG. 2. Details are not described again.

The AS security algorithm and the security key are used by the access network node to perform security protection on the data of the service. The security key may include at least one of an encryption key and an integrity key, for example, an integrity key $K_{anint}$ and/or an encryption key $K_{anenc}$. The AS security algorithm may include at least one of an encryption algorithm and an integrity protection algorithm.

In addition, for a manner of determining the AS security algorithm, refer to step 203a. For a manner of obtaining the security key, refer to step 204a. Details are not described again herein.

Further, the method may further include:

the access network node performs security protection on the data of the service based on the AS security algorithm, the security key, and the identifier associated with the service.

In another implementation scenario of the embodiment shown in FIG. 4 or FIG. 4a or FIG. 4b, when determining not to perform security protection on the data of the service, the method further includes:

the access network node indicates, to the terminal device, that the access network node is not to perform security protection on the data of the service.

Figure 5:
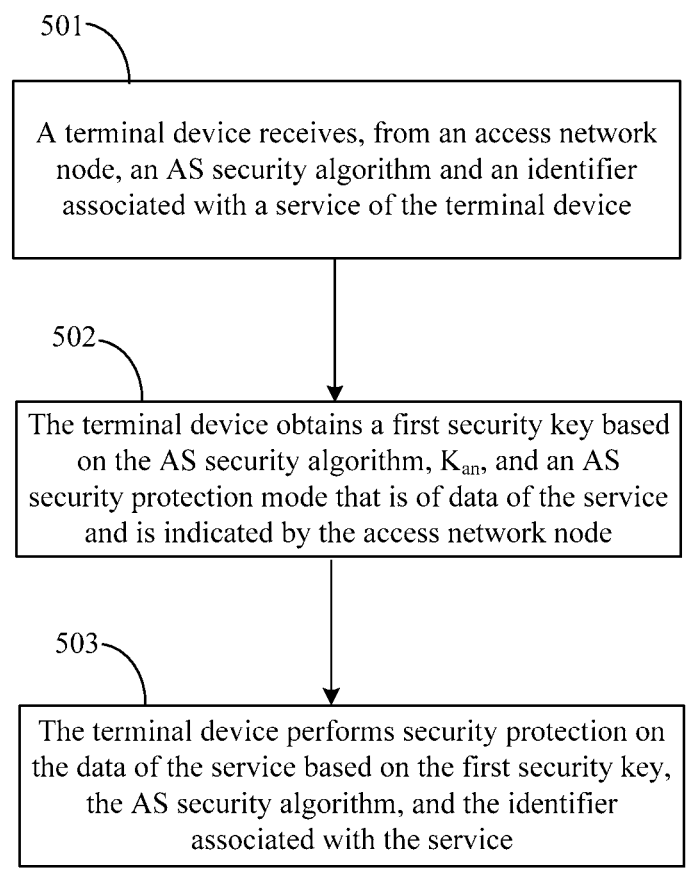
FIG. 5 is a flowchart of another method for protecting data according to an embodiment of the present disclosure.

As shown in FIG. 5, an embodiment of the present disclosure provides another method for protecting data, where the method is performed by a terminal device. The following describes the method.

501. A terminal device receives, from an access network node, an AS security algorithm and an identifier associated with a service of the terminal device.

502. The terminal device obtains a first security key based on the AS security algorithm, $K_{an}$, and an AS security protection mode that is of data of the service and is indicated by the access network node.

503. The terminal device performs security protection on the data of the service based on the first security key, the AS security algorithm, and the identifier associated with the service.

Security protection in step 503 is AS security protection, namely, security protection between the access network node and the terminal device. The security protection is used to protect user plane data, and may include at least one of encryption protection and integrity protection.

In addition, the AS security protection mode in step 502 is a mode of AS security protection, for example, encryption protection. The AS security algorithm is a security algorithm for AS security protection. The first security key is a key for AS security protection. Details are not described again.

According to the method provided in the foregoing embodiment, the terminal device performs security protection on the data of the service of the terminal device based on the AS security protection mode indicated by the access network node, that is, performs AS security protection based on the indication of the access network node. This can ensure successful decoupling between security protection by a UPF node and security protection by the access network node, and enhance security of a communications system.

Figure 5A:
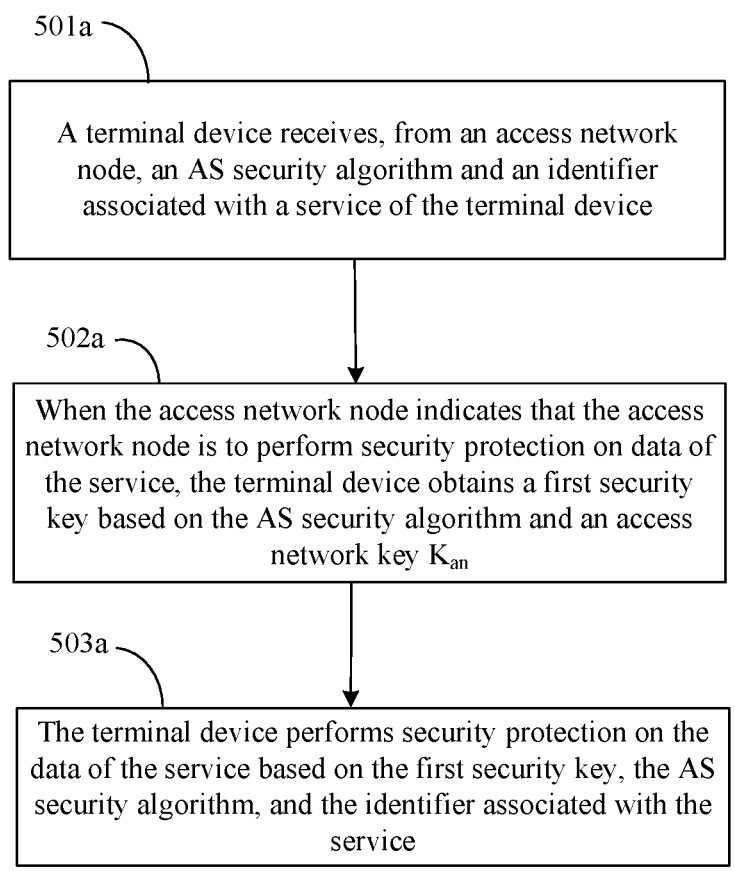
FIG. 5a is a flowchart of another method for protecting data according to an embodiment of the present disclosure.

As shown in FIG. 5a, an embodiment of the present disclosure provides another method for protecting data, where the method is performed by a terminal device. The following describes the method.

501a. A terminal device receives, from an access network node, an AS security algorithm and an identifier associated with a service of the terminal device.

502a. When the access network node indicates that the access network node is to perform security protection on data of the service, the terminal device obtains a first security key based on the AS security algorithm and an access network key $K_{an}$.

503a. The terminal device performs security protection on the data of the service based on the first security key, the AS security algorithm, and the identifier associated with the service.

Security protection is AS security protection. For the AS security algorithm and the first security key, refer to the related descriptions in FIG. 5. Details are not described again.

According to the method provided in the foregoing embodiment, the terminal device performs AS security protection on the data of the service of the terminal device based on the indication of the access network node. This can implement successful decoupling between security protection by a UPF node and security protection by the access network node, and enhance security of a communications system.

Optionally, in an implementation scenario of the embodiment shown in FIG. 5 or FIG. 5a, the method further includes the following steps.

504. The terminal device receives a UP security algorithm from a core network node.

505. The terminal device obtains a second security key based on the UP security algorithm and a user plane root key $K_{up}$.

The second security key is a key for UP security protection. The UP security protection is security protection between the UPF node and the terminal device, and is used to protect the user plane data. The UP security protection may include at least one of encryption protection and integrity protection. The UP security algorithm in step 504 is a security algorithm for UP security protection.

Optionally, step 505 specifically includes:

the terminal device obtains the second security key based on the UP security algorithm and a UP security protection mode that is of the data of the service and is indicated by the core network node.

The UP security protection mode is a mode of UP security protection, and may include at least one of encryption protection and integrity protection.

In addition, the UP security protection mode that is of the data of the service and is indicated by the core network node may be implemented in a manner of sending indication information. For details, refer to step 204. The UP security algorithm and the indication information may be carried in a same message, for example, an SMC.

Optionally, before step 505, the method further includes: the terminal device receives an indication of the core network node, indicating that a network node that is to perform security protection on the data of the service is the UPF node.

In the foregoing implementation scenario, the terminal device may simultaneously perform UP security protection and AS security protection, and therefore network security is greatly enhanced.

Figure 5B:
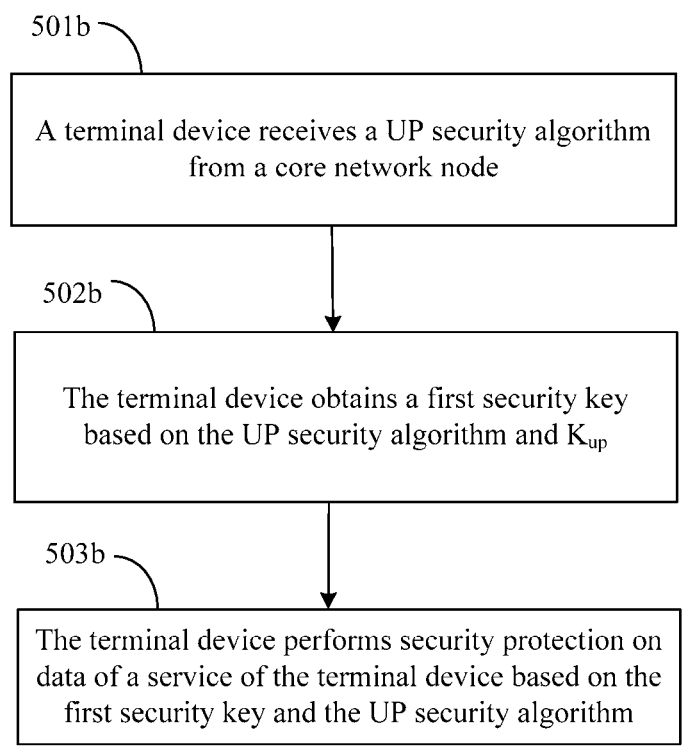
FIG. 5b is a flowchart of another method for protecting data according to an embodiment of the present disclosure.

As shown in FIG. 5*b*, an embodiment of the present disclosure provides another method for protecting data, where the method is performed by a terminal device. The following describes the method.

501*b*. A terminal device receives a UP security algorithm from a core network node.

The UP security algorithm is used to perform security protection on data of a service of the terminal device, and may include at least one of an encryption algorithm and an integrity protection algorithm.

The UP security algorithm may be carried in an SMC or a NAS message.

502*b*. The terminal device obtains a first security key based on the UP security algorithm and $K_{up}$.

503*b*. The terminal device performs security protection on data of a service of the terminal device based on the first security key and the UP security algorithm.

Security protection in step 503*b* is UP security protection, namely, security protection between a UPF node and the terminal device. The security protection is used to protect user plane data, and may include at least one of encryption protection and integrity protection.

In addition, the UP security algorithm in step 502*b* is a security algorithm for UP security protection, and the first security key is a key for UP security protection. Details are not described again.

Optionally, the method further includes: the terminal device receives a UP security protection mode that is of the data of the service and is indicated by the core network node. In step 502*b*, the terminal device may specifically obtain the first security key based on the UP security algorithm, $K_{up}$, and the UP security protection mode.

The UP security protection mode is a mode of UP security protection, for example, encryption protection.

In this embodiment of the present disclosure, the UP security protection mode that is of the data of the service and is indicated by the core network node may be implemented in a manner of sending indication information. For details, refer to step 204. The UP security algorithm and the indication information may be carried in a same message, for example, an SMC.

Optionally, before step 502*b*, the method further includes: the terminal device receives an indication of the core network node, indicating that a network node that is to perform security protection on the data of the service is the UPF node.

According to the method provided in the foregoing embodiment, the terminal device performs UP security protection based on the indication of the core network node, and performs security protection on the data of the service of the terminal device. Therefore, security protection by the UPF node and security protection by an access network node can be successfully decoupled.

Optionally, in an implementation scenario, the method further includes:

504*b*. The terminal device receives, from an access network node, an AS security algorithm and an identifier associated with the service of the terminal device.

The identifier associated with the service may be used to indicate a path for transmitting the data of the service.

505*b*. The terminal device obtains a second security key based on the AS security algorithm, $K_{an}$, and an AS security protection mode that is of the data of the service and is indicated by the access network node.

506*b*. The terminal device performs security protection on the data of the service based on the second security key, the AS security algorithm, and the identifier associated with the service.

Security protection in step 506*b* is AS security protection, namely, security protection between the access network node and the terminal device. The security protection is used to protect the user plane data, and may include at least one of encryption protection and integrity protection.

In addition, the AS security protection mode in step 505*b* is a mode of AS security protection, for example, encryption protection. The AS security algorithm is a security algorithm for AS security protection, and the second security key is a key for AS security protection. Details are not described again.

Optionally, in another implementation scenario, the method further includes:

504*b*'. The terminal device receives, from an access network node, an AS security algorithm and an identifier associated with the service of the terminal device.

505*b*'. When the access network node indicates that the access network node is to perform security protection on the data of the service, the terminal device obtains a first security key based on the AS security algorithm and $K_{an}$.

506*b*'. The terminal device performs security protection on the data of the service based on the first security key, the AS security algorithm, and the identifier associated with the service.

In the foregoing implementation scenario, the terminal device may simultaneously perform UP security protection and AS security protection, and therefore network security is greatly enhanced.

In this embodiment of the present disclosure, the core network node in FIG. 5 or FIG. 5*a* or FIG. 5*b* may be an SMF node or an AMF node.

Figure 6A:
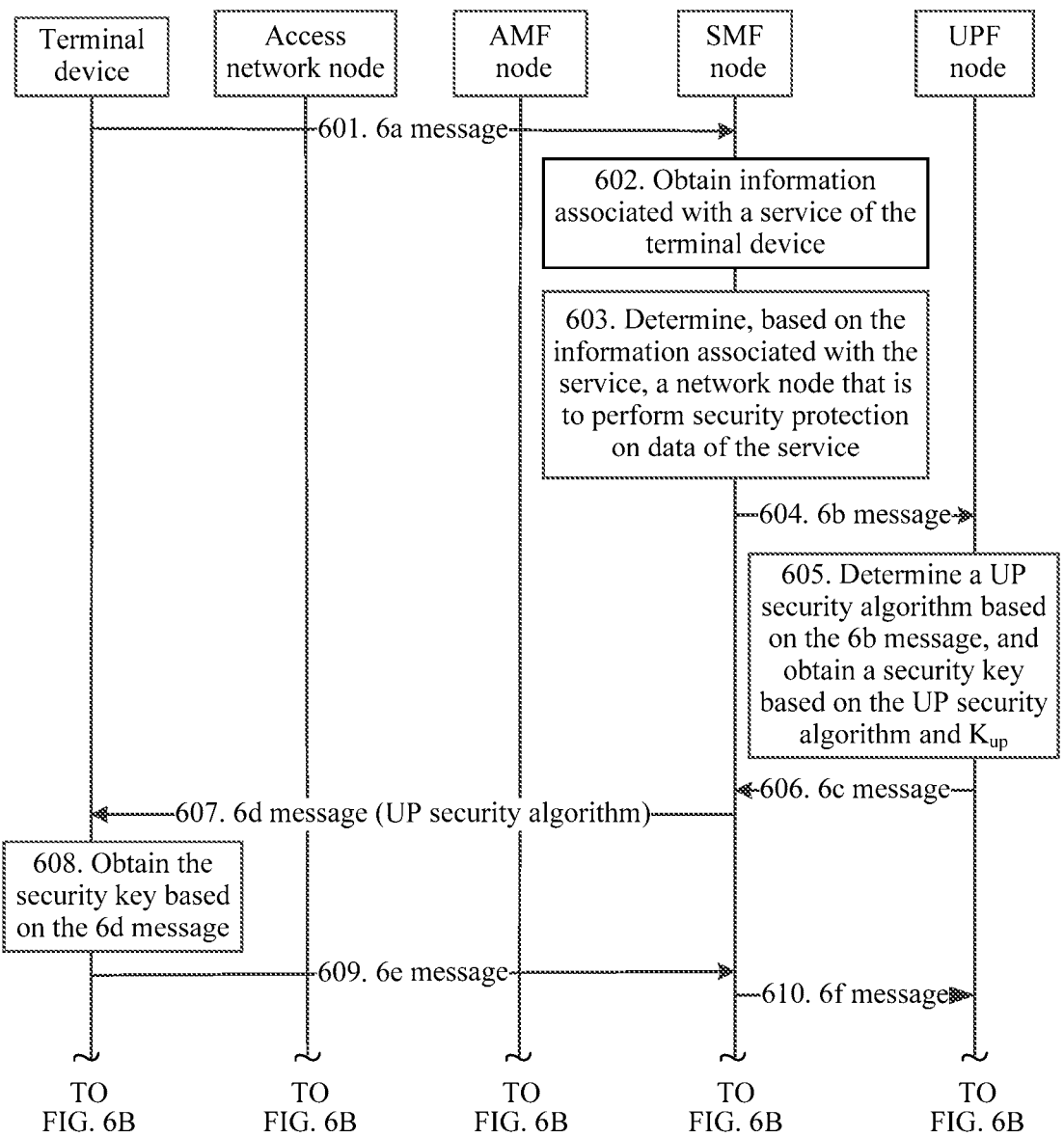
FIG. 6A and FIG. 6B are a schematic diagram of a method for protecting data according to an embodiment of the present disclosure.
Figure 6B:
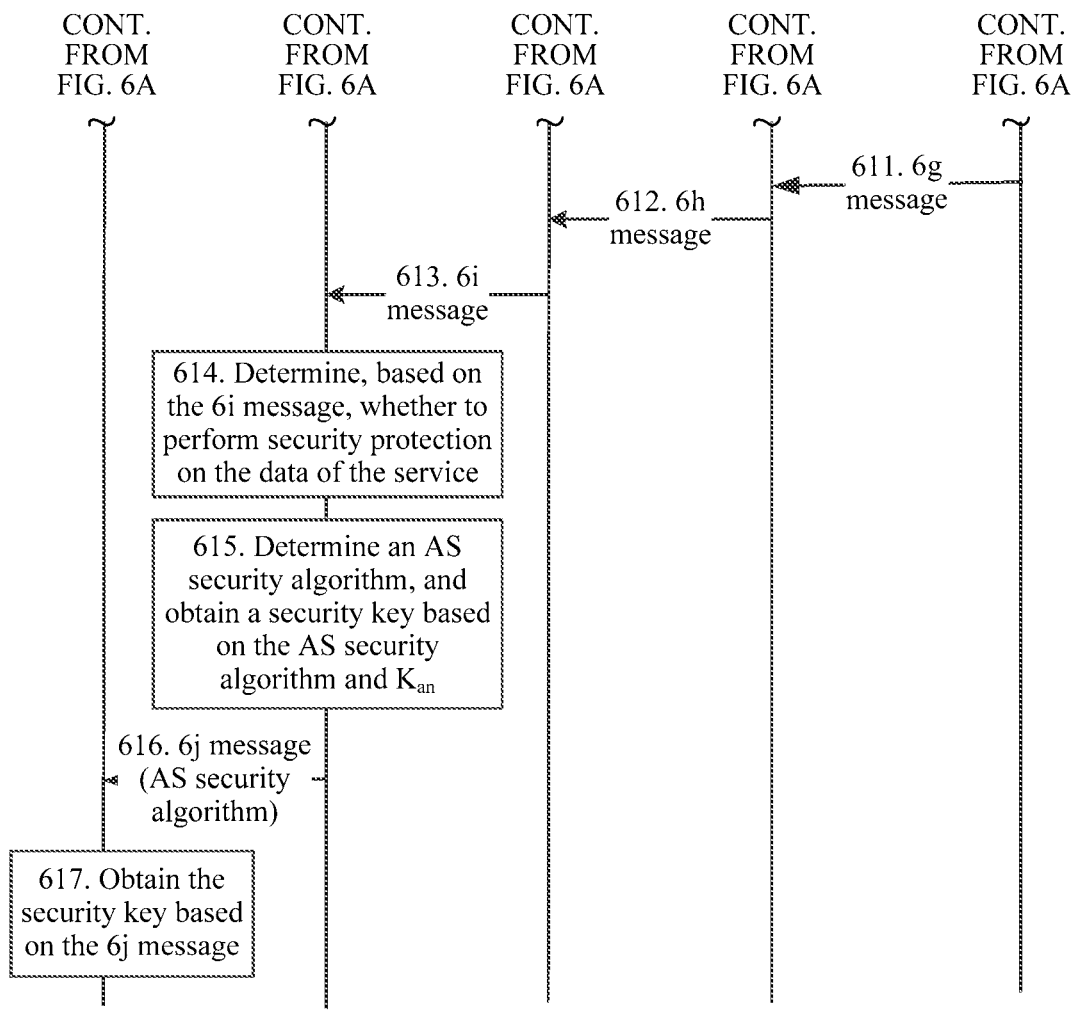

As shown in FIG. 6A and FIG. 6B, an embodiment of the present disclosure provides another method for protecting data. The following describes the method by using an example in which a core network node is an SMF node.

601. A terminal device sends a 6a message to an SMF node.

The 6a message may be used to request to set up a session for the terminal device, and may be specifically a session setup request. The 6a message includes an identifier of the terminal device, and may further include information associated with a service of the terminal device.

For the information associated with the service, refer to related descriptions in the embodiment shown in FIG. 2. Details are not described again.

602. The SMF node receives the 6a message, and obtains information associated with a service of the terminal device.

For details about obtaining the information associated with the service of the terminal device, refer to related descriptions in the embodiment shown in FIG. 2. Details are not described again.

603. The SMF node determines, based on the information associated with the service, a network node that is to perform security protection on data of the service.

For an implementation of step 603, refer to step 202. Details are not described again herein.

When it is determined that a UPF node is to perform security protection on the data of the service, steps 604 to 618 are performed; or when it is determined that an access network node is to perform security protection on the data of the service, steps 604a and 605a and steps 612 to 618 are performed. An execution sequence between steps 604a and 605a and steps 612 to 618 may be adjusted. For example, steps 604a and 605a may be performed synchronously with steps 612 to 618. This is not limited.

604a. The SMF node sends a 6b message to a UPF node.

The UPF node is a node serving the terminal device. The 6b message may be used to indicate that the network node that is to perform security protection on the data of the service is not the UPF node, or is used to indicate that the network node that is to perform security protection on the data of the service is the access network node, or is used to indicate that security protection is not to be performed on the data of the service.

The 6b message may be a session setup message.

605a. The UPF node receives the 6b message, and sends a 6c message to the SMF node.

The 6c message may be used to respond to the 6b message.

604. The SMF node sends a 6b message to a UPF node.

The 6b message may include security-related parameters, where the security-related parameters may include at least one of a security capability of the terminal device, a security policy of the UPF node, and $K_{up}$.

In addition, the 6b message may further include an identifier associated with the service, for example, a session ID, so that the UPF node can identify the data of the service. For example, the session ID may be allocated by the SMF node to the service after the SMF node receives the 6a message.

The 6b message may be specifically a session setup message.

Optionally, the 6b message may be used to explicitly or implicitly indicate that the network node is the UPF node.

When an explicit manner is used, the 6b message further includes first indication information, where the first indication information is used to indicate that the network node is the UPF node. For example, one bit is used for indicating, where 1 indicates that the network node is the UPF node, and 0 indicates that the network node is not the UPF node.

When an implicit manner is used, the UPF node may determine the network node based on whether the 6b message carries the security-related parameters. If yes, it indicates that the network node is the UPF node; otherwise, the network node is not the UPF node.

Optionally, the 6b message may be used to explicitly or implicitly indicate a UP security protection mode of the data of the service, that is, indicate a security protection mode used by the UPF node for the data of the service, for example, encryption protection or integrity protection.

When an explicit manner is used, the 6b message further includes second indication information, where the second indication information is used to indicate the UP security protection mode of the data of the service. For example, two bits are used for indicating, where 01 indicates encryption protection, 10 indicates integrity protection, and 11 indicates encryption protection and integrity protection.

When an implicit manner is used, the UPF node may determine the UP security protection mode based on the security capability of the terminal device in the security-related parameters. For example, when the security capability of the terminal device includes only an encryption capability, it indicates that the UPF node performs only encryption protection on the data of the service; or when the security capability of the terminal device includes an encryption capability and an integrity protection capability, it indicates that the UPF node performs encryption protection and integrity protection on the data of the service.

605. The UPF node determines a UP security algorithm based on the 6b message, and obtains a security key based on the UP security algorithm and $K_{up}$.

The UPF node determines the UP security algorithm based on the security capability of the terminal device and a security capability of the UPF node.

For an implementation of step 605, refer to the manner provided in the embodiment shown in FIG. 3. Details are not described again.

In addition, the UP security algorithm may include at least one of an encryption algorithm and an integrity protection algorithm, and the security key may include at least one of an encryption key and an integrity key.

Further, the security key in step 605 may be a security key obtained after a security key derived based on the UP security algorithm and $K_{up}$ is truncated according to the security policy of the UPF node.

606. The UPF node sends a 6c message to the SMF node, where the 6c message includes the UP security algorithm.

The 6c message may be a response to the 6b message.

607. The SMF node receives the 6c message, and sends a 6d message to the terminal device, where the 6d message includes the UP security algorithm.

The 6d message may be an SMC, or may be a NAS message. In addition, the 6d message may further include third indication information. The third indication information may be used to indicate that the network node is the UPF node; or the third indication information may be used to indicate the UP security protection mode of the data of the service.

608. The terminal device receives the 6d message, and obtains the security key based on the 6d message.

The security key in step 608 is used by the terminal device to perform security protection on the data of the service.

For example, the obtaining the security key based on the 6d message may include: the terminal device may obtain the security key based on the UP security algorithm and $K_{up}$. Specifically, the following manners may be used.

Manner 1: When the 6d message includes the third indication information, and the third indication information is used to indicate that the network node is the UPF node, the terminal device obtains the security key based on the UP security algorithm and $K_{up}$.

Manner 2: When the 6d message includes the third indication information, and the third indication information is used to indicate the UP security protection mode of the data of the service, the obtaining the security key based on the 6d message may include: the terminal device obtains the security key based on the UP security protection mode, the UP security algorithm, and $K_{up}$. For example, if the UP security protection mode is encryption protection, the terminal device obtains the encryption key based on the encryption algorithm in the UP security algorithm and $K_{up}$.

609. The terminal device sends a 6e message to the SMF node.

The 6e message may be security mode command complete (SMP).

610. The SMF node receives the 6e message, and sends a 6f message to the UPF node.

The 6f message may be used to instruct the UPF node to perform security protection on the data of the service. In other words, the 6f message instructs the UPF node to immediately perform security protection on the data of the service, or instructs the UPF node to start to perform security protection on the data of the service, or instructs the UPF node to enable security protection on the data of the service.

611. The UPF node sends a 6g message to the SMF node.

The 6g message may be a response to the 6f message.

612. The SMF node sends a 6h message to an AMF node.

The 6h message may include the identifier associated with the service, for example, the session ID. The 6h message may further include a security policy of the access network node.

In addition, the 6h message may further include fourth indication information.

For example, if it is determined in step 603 that the access network node is to perform security protection on the data of the service, the fourth indication information may be used to indicate that the network node is the access network node, or that the network node is not the UPF node.

For another example, if it is determined in step 603 that the UPF node is to perform security protection on the data of the service, the fourth indication information may be used to indicate that the network node is not the access network node, or that the network node is the UPF node, or the UP security protection mode of the data of the service.

613. The AMF node receives the 6h message, and sends a 6i message to an access network node.

Content included in the 6i message may be the same as content included in the 6h message. Details are not described again.

614. The access network node receives the 6i message, and determines, based on the 6i message, whether to perform security protection on the data of the service.

The 6i message may trigger the access network node to determine whether to perform security protection on the data of the service. The access network node may also determine, based on the content in the 6i message, whether to perform security protection on the data of the service. For details, refer to the related descriptions in the embodiment shown in FIG. 4 or FIG. 4a or FIG. 4b. Details are not described again.

If the access network node determines to perform security protection on the data of the service in step 614, steps 615 to 617 are performed; otherwise, step 618 is performed.

615. The access network node determines an AS security algorithm, and obtains a security key based on the AS security algorithm and $K_{an}$.

For details, refer to the related descriptions in the embodiment shown in FIG. 4 or FIG. 4a or FIG. 4b.

616. The access network node sends a 6j message to the terminal device, where the 6j message includes the AS security algorithm.

The 6j message may be used to indicate that the access network node is to perform security protection on the data of the service, or indicate an AS security protection mode of the data of the service.

For example, the 6j message may include fifth indication information, where the fifth indication information is used to indicate that the access network node is to perform security protection on the data of the service, or indicate the AS security protection mode of the data of the service.

The 6j message may be a radio resource control (RRC) message.

617. The terminal device receives the 6j message, and obtains the security key based on the 6j message.

For details, refer to the related descriptions in the embodiment shown in FIG. 5 or FIG. 5a or FIG. 5b. Details are not described again.

618. The access network node sends a 6j message to the terminal device.

The 6j message is used to indicate that the access network node is not to perform security protection on the data of the service.

In this embodiment of the present disclosure, the message used for responding to the received message may not be executed in the foregoing embodiment. Steps 612 to 618 and steps 604 to 611 may be interchanged in an execution sequence. This is not limited.

According to the method provided in the foregoing embodiment, the core network node obtains the information associated with the service of the terminal device, and determines, based on the information associated with the service, the network node that is to perform security protection on the data of the service. Because different network nodes can be flexibly selected to perform security protection on different services, a security requirement of an operator or a service can be satisfied. In addition, the access network node independently determines whether the access network node is to perform security protection, implementing decoupling between security protection by the access network node and security protection by the UPF node, and enhancing network security.

Optionally, in an implementation scenario, after step 605, the method further includes:

the UPF node obtains a first message authentication code (MAC) based on $K_{up}$ stored by the UPF node and a first random number.

In this case, both the 6c message and the 6d message include the first random number and the first MAC, and step 608 further includes:

the terminal device verifies the first MAC based on $K_{up}$ stored by the terminal device and the first random number; and if the first MAC is verified successfully, the terminal device obtains a second MAC based on the $K_{up}$ stored by the terminal device and a second random number.

The 6e message and the 6f message carry the second random number and the second MAC.

Before step 611, the method further includes: the UPF node verifies the second MAC based on the $K_{up}$ stored by the UPF node and the second random number; and if the second MAC is verified successfully, the UPF node performs security protection on the data of the service.

The method for verifying the MAC pertains to the prior art, and is not described again.

The foregoing implementation scenario is used to verify whether user plane root keys used by the terminal device and the UPF node are the same. Security protection is performed on the data of the service only when the user plane root keys are the same.

The implementation scenario in this embodiment of the present disclosure may be applied to other embodiments, for example, the embodiments shown in FIG. 7 to FIG. 9B. Details are not described again subsequently.

In an example, step 616 may be replaced as follows: The access network node sends the fifth indication information and the AS security algorithm to the terminal device separately. For example, the fifth indication information may be carried in an RRC message and sent to the terminal device, and the AS security algorithm may be carried in an AS SMC and sent to the terminal.

Figure 7:
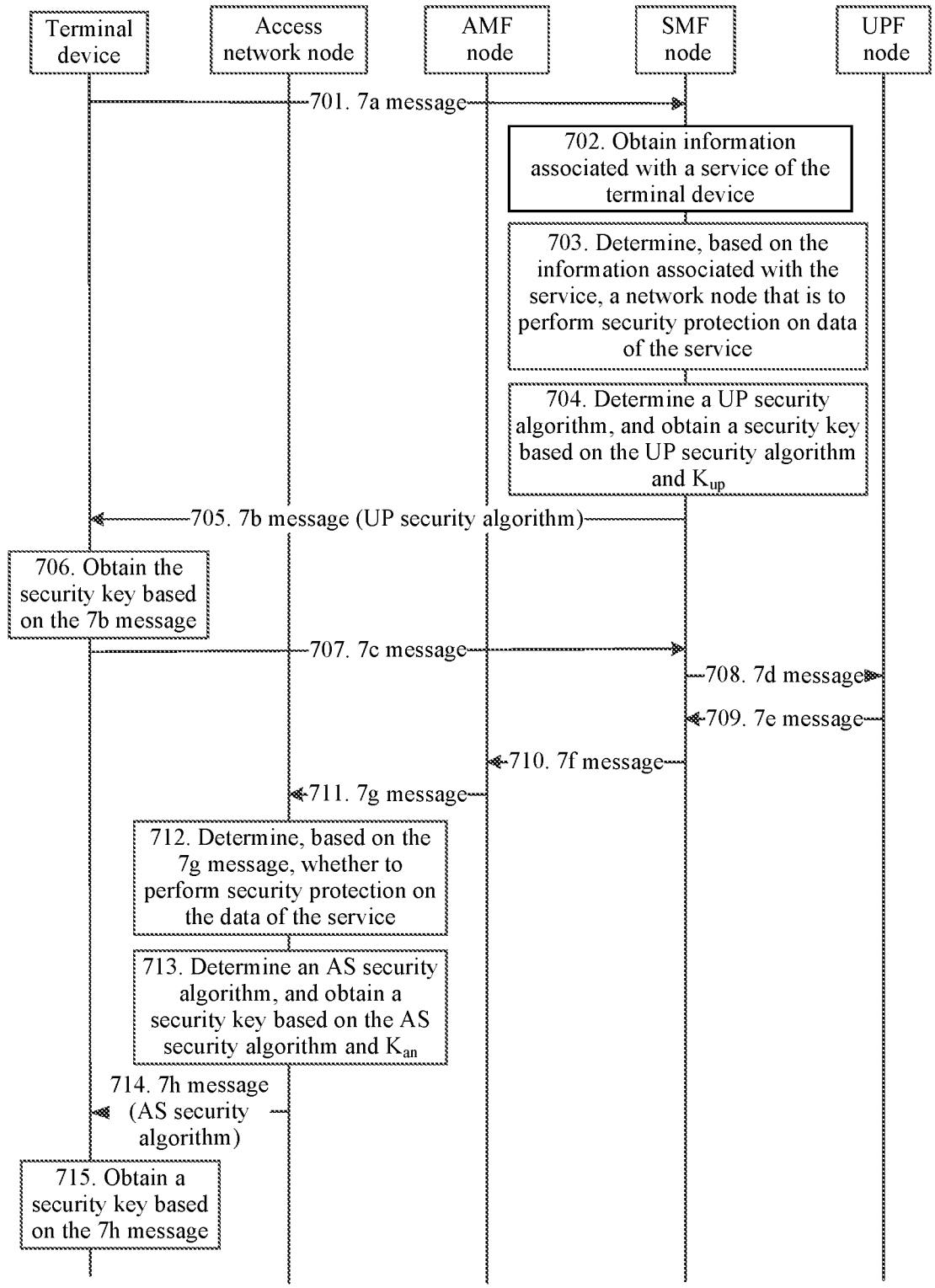
FIG. 7 is a schematic diagram of another method for protecting data according to an embodiment of the present disclosure.

As shown in FIG. 7, an embodiment of the present disclosure provides another method for protecting data. The following describes the method by using an example in which a core network node is an SMF node.

In this method, steps 701 to 703 are the same as steps 601 to 603, and only message names are correspondingly adjusted.

When it is determined in step 703 that a UPF node is to perform security protection on the data of the service, step 704 is performed.

704. The SMF node determines a UP security algorithm, and obtains a security key based on the UP security algorithm and $K_{up}$.

Step 704 may be implemented by using steps 204a and 205a, and is not described again.

705. The SMF node sends a 7b message to the terminal device, where the 7b message includes the UP security algorithm.

Optionally, the 7b message may carry the third indication information in step 607. Details are not described again.

706. The terminal device receives the 7b message, and obtains the security key based on the 7b message.

The security key may be obtained based on the 7b message in the two manners in step 608. Details are not described again.

In addition, the 7b message may be an SMC or a NAS message.

707. The terminal device sends a 7c message to the SMF node.

The 7c message may be SMP.

708. The SMF node receives the 7c message, and sends a 7d message to the UPF node.

The 7d message may include the UP security algorithm, the security key, and the identifier associated with the service; and may further include the first indication information or the second indication information in step 604. Details are not described again.

In addition, the 7d message may be used to indicate that the UPF node is to perform security protection on the data of the service.

709. The UPF node receives the 7d message, and sends a 7e message to the SMF node.

The 7e message may be a response to the 7d message.

The method further includes steps 710 to 716. Steps 710 to 716 are the same as steps 612 to 618 in the embodiment shown in FIG. 6B, and only message names are correspondingly adjusted.

In addition, an execution sequence between steps 710 to 716 and steps 704 to 709 may be adjusted. This is not limited.

According to the method provided in the foregoing embodiment, the core network node obtains the information associated with the service of the terminal device, and determines, based on the information associated with the service, the network node that is to perform security protection on the data of the service. Because different network nodes can be flexibly selected to perform security protection on different services, a security requirement of an operator or a service can be satisfied. In addition, the access network node independently determines whether the access network node is to perform security protection, implementing decoupling between security protection by the access network node and security protection by the UPF node, and enhancing network security.

Figure 8:
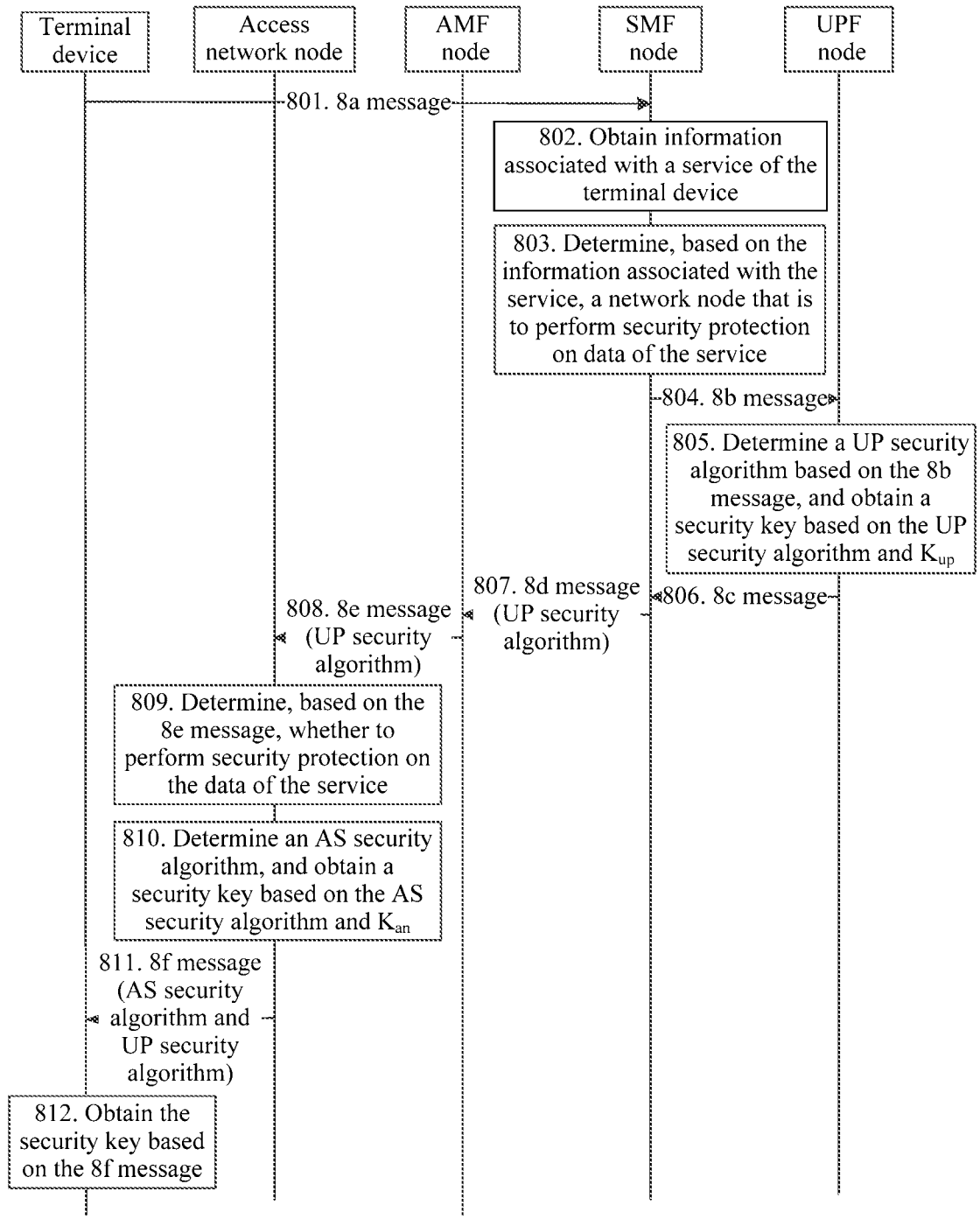
FIG. 8 is a schematic diagram of another method for protecting data according to an embodiment of the present disclosure.

As shown in FIG. 8, an embodiment of the present disclosure provides another method for protecting data. The following describes the method by using an example in which a core network node is an SMF node.

In this method, steps 801 to 803 are the same as steps 601 to 603, and only message names are correspondingly adjusted.

When it is determined in step 803 that a UPF node is to perform security protection on the data of the service, step 804 is performed.

In addition, steps 804 to 806 are the same as steps 604 to 606, and only message names are correspondingly adjusted.

807. The SMF node receives the 8c message, and sends an 8d message to an AMF node.

The 8d message includes a UP security algorithm. For example, the UP security algorithm may be carried in a NAS container, and the NAS container is carried in the 8d message.

In an example, the NAS container may further carry the third indication information in the embodiment shown in FIG. 6A. Details are not described again.

In addition, the 8d message may further include the fourth indication information in step 612, and may further include the identifier associated with the service, for example, a session ID, and may further include a security policy of an access network node.

808. The AMF node receives the 8d message, and sends an 8e message to an access network node.

Content included in the 8e message may be the same as content included in the 8d message. Details are not described again.

809. The access network node receives the 8e message, and determines, based on the 8e message, whether to perform security protection on the data of the service.

Step 809 is the same as step 614. Details are not described again.

If the access network node determines to perform security protection on the data of the service in step 809, step 810 is performed; otherwise, step 811 is directly performed.

810. The access network node determines an AS security algorithm, and obtains a security key based on the AS security algorithm and $K_{an}$.

For details, refer to the related descriptions in the embodiment shown in FIG. 4 or FIG. 4a or FIG. 4b.

811. The access network node sends an 8f message to the terminal device, where the 8f message includes the UP security algorithm.

The 8f message may include the NAS container.

Optionally, when the access network node determines to perform security protection on the data of the service in step

809, the 8*f* message further includes the AS security algorithm, and may further include the fifth indication information in step 616.

Optionally, when the access network node determines not to perform security protection on the data of the service in step 809, the 8*f* message may further include information used to indicate that the access network node is not to perform security protection on the data of the service.

812. The terminal device obtains the security key based on the 8*f* message.

For details, refer to the related descriptions in the embodiment shown in FIG. 5 or FIG. 5*a* or FIG. 5*b*.

The terminal device obtains a first security key based on the UP security algorithm and $K_{up}$.

Optionally, step 812 further includes: the terminal device obtains a second security key based on the AS security algorithm and $K_{an}$.

According to the method provided in the foregoing embodiment, the core network node obtains the information associated with the service of the terminal device, and determines, based on the information associated with the service, the network node that is to perform security protection on the data of the service. Because different network nodes can be flexibly selected to perform security protection on different services, a security requirement of an operator or a service can be satisfied. In addition, the access network node independently determines whether the access network node is to perform security protection, implementing decoupling between security protection by the access network node and security protection by the UPF node, and enhancing network security.

Figure 9A:
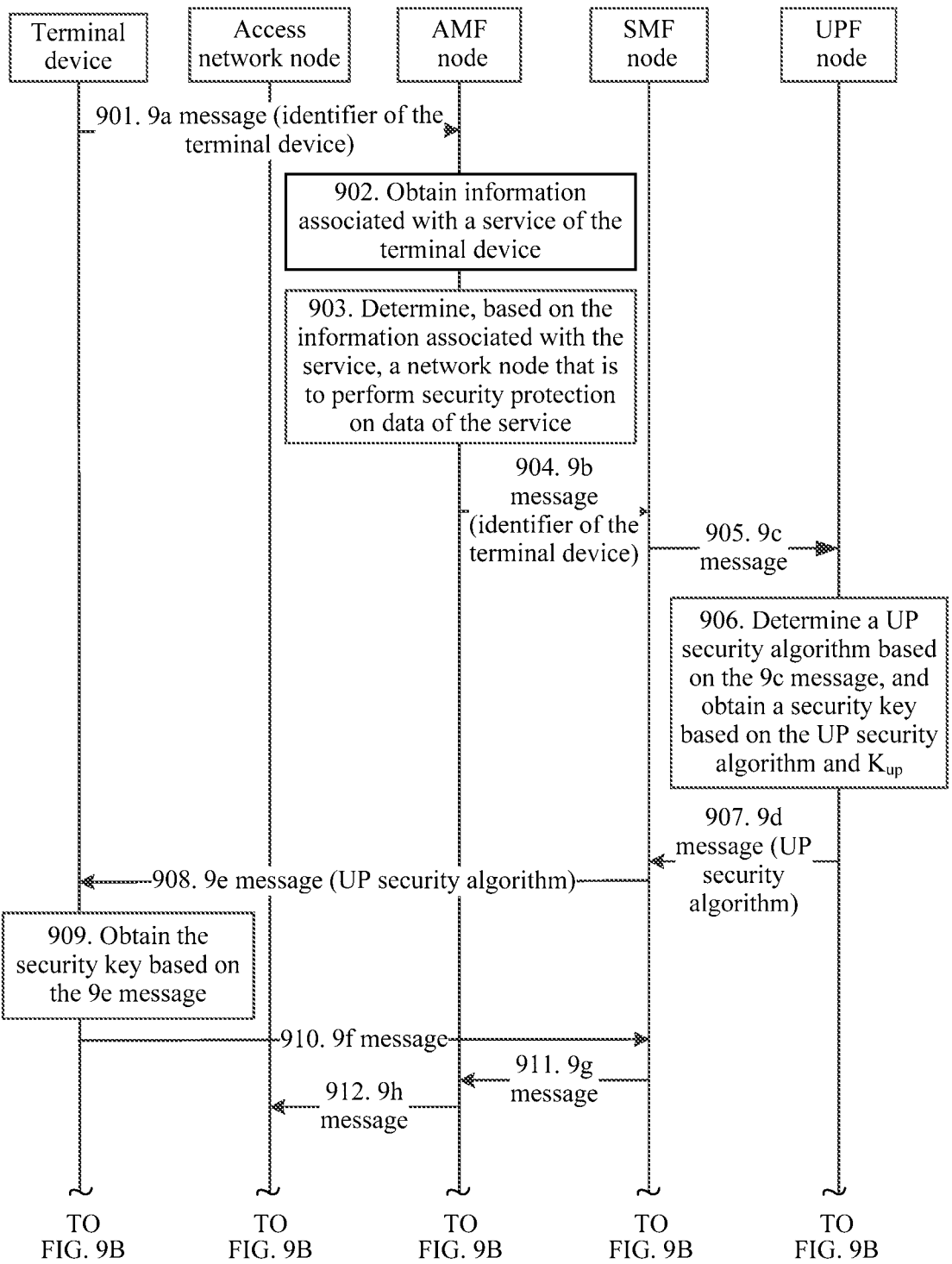
FIG. 9A and FIG. 9B are a schematic diagram of another method for protecting data according to an embodiment of the present disclosure.
Figure 9B:
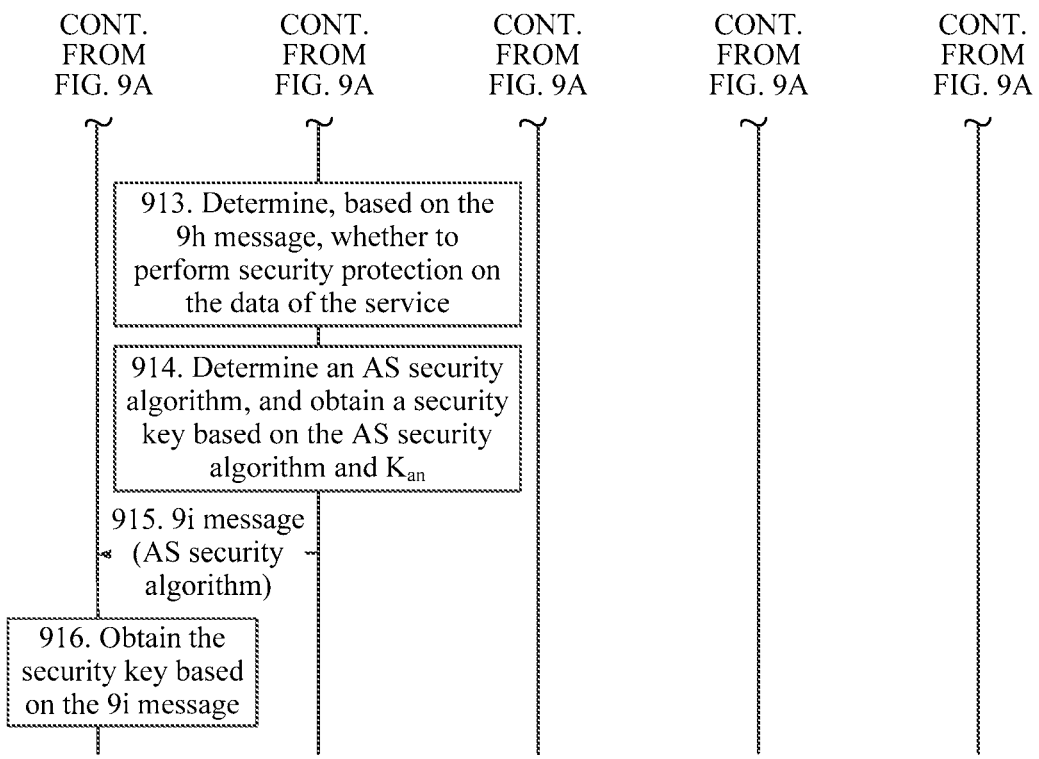

As shown in FIG. 9A and FIG. 9B, an embodiment of the present disclosure provides another method for protecting data. The following describes the method by using an example in which a core network node is an AMF node.

901. A terminal device sends a 9*a* message to an AMF node, where the 9*a* message includes an identifier of the terminal device.

The identifier of the terminal may be used to uniquely indicate the terminal device, and pertains to the prior art.

The 9*a* message may be used to request to set up a session for the terminal device, and may be specifically a session setup request. The 9*a* message includes the identifier of the terminal device, and may further include information associated with a service of the terminal device.

For the information associated with the service, refer to related descriptions in the embodiment shown in FIG. 2. Details are not described again.

902. The AMF node receives the 9*a* message, and obtains information associated with a service of the terminal device.

For details about obtaining the information associated with the service of the terminal device, refer to related descriptions in the embodiment shown in FIG. 2. Details are not described again.

903. The AMF node determines, based on the information associated with the service, a network node that is to perform security protection on data of the service.

For an implementation of step 903, refer to step 202. Details are not described again herein.

When it is determined that a UPF node is to perform security protection on the data of the service, steps 904 to 917 are performed; or when it is determined that an access network node is to perform security protection on the data of the service, steps 904*a* and 905*a* and steps 911 to 917 are performed.

904*a*. The AMF node sends a 9*b* message to an SMF node.

The 9*b* message includes the identifier of the terminal device. The 9*b* message may be used to indicate that the network node that is to perform security protection on the data of the service is not the UPF node, or the 9*b* message is used to indicate that the network node that is to perform security protection on the data of the service is the access network node, or the 9*b* message is used to indicate that security protection is not to be performed on the data of the service.

In an example, the indication function of the 9*b* message may be implemented by using indication information. Details are not described again.

In addition, the 9*b* message may be a session setup message.

905*a*. The SMF node receives the 9*b* message, and sends a 9*c* message to a UPF node.

The 9*c* message may include an identifier associated with the service, for example, a session ID. In addition, the 9*c* message has an indication function of the 9*b* message in step 904*a*. In an example, the 9*c* message may include the indication information in step 904*a*.

The 9*c* message may be a session setup message.

The UPF node is a node serving the terminal device.

In this embodiment of the present disclosure, after receiving the 9*b* message, the SMF node may allocate a path to the service of the terminal device, where the path is used to transmit the data of the service. For example, a session ID may be allocated to the service.

904. The AMF node sends a 9*b* message to an SMF node.

The 9*b* message may include the identifier of the terminal device, and may further include the first indication information or the second indication information in the embodiment shown in FIG. 6A. The 9*b* message may further include security-related parameters. The security-related parameters may include at least one of a security capability of the terminal device, a security policy of the UPF node, and $K_{up}$.

905. The SMF node receives the 9*b* message, and sends a 9*c* message to a UPF node.

The 9*c* message may include an identifier associated with the service, for example, a session ID.

In an example, when step 904 includes the first indication information, the 9*c* message further includes the first indication information in step 904.

In another example, when step 904 includes the second indication information, the 9*c* message further includes the second indication information in step 904.

906. The UPF node determines a UP security algorithm based on the 9*c* message, and obtains a security key based on the UP security algorithm and $K_{up}$.

For details, refer to the manner provided in the embodiment shown in FIG. 3. Details are not described again.

907. The UPF node sends a 9*d* message to the SMF node, where the 9*d* message includes the UP security algorithm.

908. The SMF node receives the 9*d* message, and sends a 9*e* message to the terminal device, where the 9*e* message includes the UP security algorithm.

The 9*e* message may be an SMC. The 9*e* message may further include the first indication information or the second indication information in step 904.

909. The terminal device obtains the security key based on the 9*e* message.

For step 909, refer to the related descriptions in step 608. Details are not described again.

910. The terminal device sends a 9*f* message to the SMF node.

The 9*f* message may be SMP.

911. The SMF node sends a 9g message to the AMF node.

912. The AMF node receives the 9g message, and sends a 9h message to an access network node.

The 9h message may include the identifier associated with the service, and may further include the fourth indication information in step 612, and may further include a security policy of the access network node.

913. The access network node determines, based on the 9h message, whether to perform security protection on the data of the service.

For step 913, refer to the descriptions in step 614. Details are not described again.

If the access network node determines to perform security protection on the data of the service in step 913, steps 914 to 916 are performed; otherwise, step 917 is performed.

914. The access network node determines an AS security algorithm, and obtains a security key based on the AS security algorithm and $K_{an}$.

For details, refer to the related descriptions in the embodiment shown in FIG. 4 or FIG. 4a or FIG. 4b.

915. The access network node sends a 9i message to the terminal device, where the 9i message includes the AS security algorithm.

The 9i message may be used to indicate that the access network node is to perform security protection on the data of the service, or indicate an AS security protection mode of the data of the service. For example, the 9i message may include the fifth indication information in the embodiment shown in FIG. 6B.

The 9i message may be an RRC message.

916. The terminal device receives the 9i message, and obtains the security key based on the 9i message.

For details, refer to the related descriptions in the embodiment shown in FIG. 5 or FIG. 5a or FIG. 5b. Details are not described again.

917. The access network node sends a 9i message to the terminal device.

The 9i message is used to indicate that the access network node is not to perform security protection on the data of the service.

According to the method provided in the foregoing embodiment, the core network node obtains the information associated with the service of the terminal device, and determines, based on the information associated with the service, the network node that is to perform security protection on the data of the service. Because different network nodes can be flexibly selected to perform security protection on different services, a security requirement of an operator or a service can be satisfied. In addition, the access network node independently determines whether the access network node is to perform security protection, implementing decoupling between security protection by the access network node and security protection by the UPF node, and enhancing network security.

Figure 10:
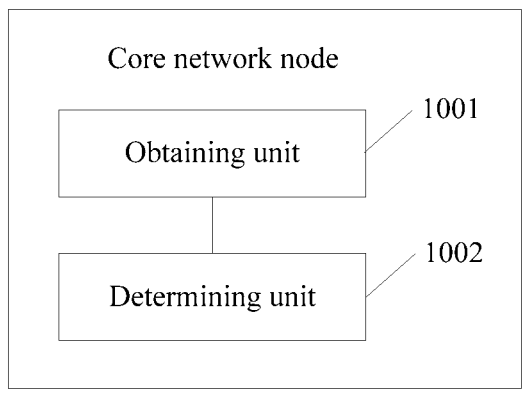
FIG. 10 is a schematic structural diagram of a core network node according to an embodiment of the present disclosure.

As shown in FIG. 10, an embodiment of the present disclosure provides a core network node. The core network node may be an AMF node or an SMF node, and may be configured to perform the actions or steps of the core network node in the embodiment shown in FIG. 2, or may be configured to perform the actions or steps of the SMF node in the embodiments shown in FIG. 6A to FIG. 8, or may be configured to perform the actions or steps of the AMF node in the embodiment shown in FIG. 9A and FIG. 9B. The core network node may include an obtaining unit 1001 and a determining unit 1002.

The obtaining unit 1001 is configured to obtain information associated with a service of a terminal device.

The determining unit 1002 is configured to determine, based on the information associated with the service and obtained by the obtaining unit 1001, a network node that is to perform security protection on data of the service.

Optionally, the determining unit 1002 is further configured to:

determine the network node based on a security capability of a UPF node connected to the core network node and the information associated with the service; or determine the network node based on a correspondence between the information associated with the service and the network node that is to perform security protection.

Optionally, the obtaining unit 1001 is further configured to:

receive a request message from the terminal device, where the request message is used to request to set up a session for the service, and the request message includes the information associated with the service; or obtain, based on slice information associated with the core network node, the information associated with the service.

Optionally, in an implementation scenario, the network node is the UPF node, and the core network node further includes:

a sending unit 1003, configured to send security-related parameters to the UPF node.

The security-related parameters may include a user plane root key $K_{up}$, a security capability of the terminal device, and a security policy of the UPF node.

Further, the sending unit 1003 may be further configured to:

indicate a UP security protection mode of the data of the service to the UPF node, where the UP security protection mode includes at least one of encryption protection and integrity protection; or indicate, to the UPF node, that the network node is the UPF node.

The security capability of the terminal device may include only an encryption capability of the terminal device; or the security capability of the terminal device may include only an integrity protection capability of the terminal device; or the security capability of the terminal device may include an encryption capability of the terminal device and an integrity protection capability of the terminal device.

Further, the core network node is an SMF node, and the core network node may further include:

a receiving unit 1004, configured to receive a UP security algorithm from the UPF node.

Optionally, in another implementation scenario, the network node is the UPF node, the core network node is an SMF node, and the core network node further includes a sending unit 1003, where the determining unit 1002 is configured to determine a UP security algorithm based on a security capability of the terminal device and the security capability of the UPF node, and obtain a security key based on the UP security algorithm, $K_{up}$, and a security policy of the UPF node; and the sending unit 1003 is configured to send the UP security algorithm, the security key, and an identifier associated with the service to the UPF node.

Further, the sending unit 1003 may be further configured to send the UP security algorithm to the terminal device.

Further, the sending unit 1003 may be further configured to instruct the UPF node to perform security protection on the data of the service.

Further, the sending unit 1003 may be further configured to indicate a UP security protection mode of the data of the service to the terminal device, where the UP security protection mode includes at least one of encryption protection and integrity protection.

Optionally, the sending unit 1003 is further configured to send a security policy of an access network node and the identifier associated with the service to the access network node.

Further, the sending unit 1003 may be further configured to:

indicate, to the access network node, that the network node is not the access network node; or indicate, to the access network node, that the network node is the UPF node; or indicate the UP security protection mode of the data of the service to the access network node.

Optionally, in another implementation scenario, the network node is an access network node, and the core network node further includes:

a sending unit 1003, configured to send a security policy of the access network node and an identifier associated with the service to the access network node, and indicate, to the access network node, that the network node is the access network node, or indicate, by the core network node to the access network node, that the network node is not the UPF node.

Further, the sending unit 1003 may be further configured to:

instruct the UPF node serving the terminal device not to perform security protection on the data of the service; or indicate, to the UPF node serving the terminal device, that the network node is not the UPF node; or indicate, to the UPF node serving the terminal device, that the network node is the access network node.

The core network node provided in the foregoing embodiment is configured to obtain the information associated with the service of the terminal device, and determine, based on the information associated with the service, the network node that is to perform security protection on the data of the service. Because different network nodes can be flexibly selected to perform security protection on different services, a security requirement of an operator or a service can be satisfied. For example, the UPF node may perform security protection on data of a banking service, and this greatly enhances security. In addition, when the UPF node is used as a fixed network node for performing security protection, the method further resolves a resource waste problem caused by sending data of a roaming user to a UPF node of a home network for security protection.

Figure 11:
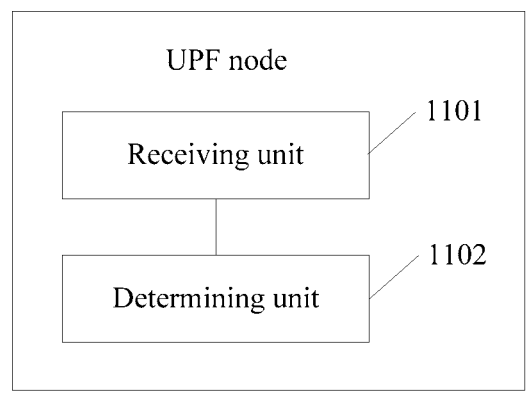
FIG. 11 is a schematic structural diagram of a UPF node according to an embodiment of the present disclosure.

As shown in FIG. 11, an embodiment of the present disclosure provides a UPF node, where the UPF node may be configured to perform the actions or steps of the UPF node in the embodiment shown in FIG. 3, or may be configured to perform the actions or steps of the UPF node in the embodiments shown in FIG. 6A to FIG. 9B. The UPF node may include a receiving unit 1101 and a determining unit 1102.

The receiving unit 1101 is configured to receive, from a core network node, information about a network node that is to perform security protection on data of a service of a terminal device or information about a security protection mode.

The determining unit 1102 is configured to determine, based on the information about the network node or the information about the security protection mode that is received by the receiving unit 1101, whether to perform security protection on the data of the service.

The information about the network node may include:

the network node that is to perform security protection on the data of the service is an access network node; or the network node that is to perform security protection on the data of the service is not an access network node; or the network node that is to perform security protection on the data of the service is not the UPF node; or the network node that is to perform security protection on the data of the service is the UPF node.

The information about the security protection mode includes a user plane UP security protection mode of the data of the service, and the UP security protection mode includes at least one of encryption protection and integrity protection.

Optionally, when determining to perform security protection on the data of the service of the terminal device, the determining unit 1102 is further configured to:

obtain a security capability of the terminal device, a user plane root key $K_{up}$, and a security policy of the UPF node;

determine a UP security algorithm based on the security capability of the terminal device and a security capability of the UPF node; and obtain a security key based on the UP security algorithm, the $K_{up}$, and the security policy of the UPF node.

Further, the determining unit 1102 may be further configured to:

when the security capability of the terminal device includes only an encryption capability of the terminal device, determine an encryption algorithm based on the encryption capability of the terminal device and an encryption capability of the UPF node; or when the security capability of the terminal device includes only an integrity protection capability of the terminal device, determine an integrity protection algorithm based on the integrity protection capability of the terminal device and an integrity protection capability of the UPF node; or when the security capability of the terminal device includes an encryption capability of the terminal device and an integrity protection capability of the terminal device, determine an encryption algorithm and an integrity protection algorithm based on the security capability of the terminal device and the security capability of the UPF node.

Optionally, when the information about the security protection mode includes the UP security protection mode, the determining unit 1102 is further configured to:

determine the UP security algorithm based on the UP security protection mode, the security capability of the terminal device, and the security capability of the UPF node.

Further, the determining unit 1102 may be further configured to:

when the UP security protection mode is encryption protection, determine an encryption algorithm based on an encryption capability of the terminal device and an encryption capability of the UPF node; or when the UP security protection mode is integrity protection, determine an integrity protection algorithm based on an integrity protection capability of the terminal device and an integrity protection capability of the UPF node; or when the UP security protection mode is encryption protection and integrity protection, determine an encryption algorithm and an integrity protection algorithm based on the security capability of the terminal device and the security capability of the UPF node.

Optionally, the UPF node further includes:

a sending unit 1103, configured to send the UP security algorithm to the terminal device.

Optionally, the core network node is a session management function SMF node, and the UPF node further includes:

an execution unit 1104, configured to perform security protection on the data of the service based on the security key, the UP security algorithm, and an identifier associated with the service.

The UPF node provided in this embodiment is configured to receive, from the core network node, the information about the network node that is to perform security protection on the data of the service of the terminal device or the information about the security protection mode, and determine, based on the information about the network node or the information about the security protection mode, whether to perform security protection on the data of the service. Therefore, the UPF node can flexibly perform security protection on the service of the terminal device based on the indication about the network node, to satisfy a security requirement of an operator or the service.

Figure 12:
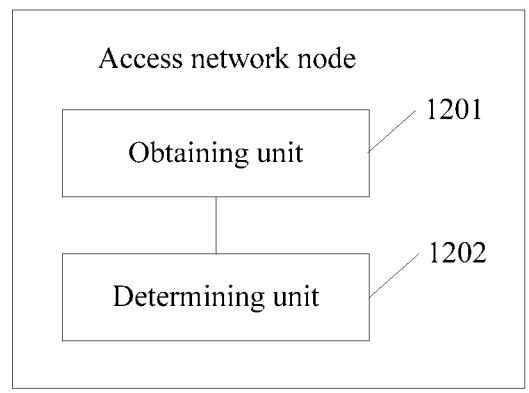
FIG. 12 is a schematic structural diagram of an access network node according to an embodiment of the present disclosure.

As shown in FIG. 12, an embodiment of the present disclosure provides an access network node, where the access network node may be configured to perform the actions or steps of the access network node in the embodiment shown in FIG. 4a, or may be configured to perform the actions or steps of the access network node in the embodiments shown in FIG. 6A to FIG. 9B. The access network node includes an obtaining unit 1201 and a determining unit 1202.

The obtaining unit 1201 is configured to obtain information associated with a service of a terminal device.

The determining unit 1202 is configured to determine, based on the information associated with the service and obtained by the obtaining unit 1201, whether to perform security protection on data of the service.

Alternatively, the obtaining unit 1201 is configured to perform step 401 in FIG. 4, and the determining unit 1202 is configured to perform step 402; or the obtaining unit 1201 is configured to perform step 401b in FIG. 4b, and the determining unit 1202 is configured to perform step 402b.

Optionally, the determining unit 1202 is further configured to:

determine, based on the information associated with the service and information indicated by a core network node, whether to perform security protection on the data of the service.

The indicated information may include:

a network node that is to perform security protection on the data of the service is the access network node; or a network node that is to perform security protection on the data of the service is not the access network node; or a network node that is to perform security protection on the data of the service is not a user plane function UPF node; or a network node that is to perform security protection on the data of the service is a UPF node; or a user plane UP security protection mode of the data of the service, where the UP security protection mode includes at least one of encryption protection and integrity protection.

Optionally, in an implementation scenario, when determining to perform security protection on the data of the service, the access network node further includes:

a sending unit 1203, configured to indicate, to the terminal device, that the access network node is to perform security protection on the data of the service, or indicate an access stratum AS security protection mode of the data of the service to the terminal device, where the AS security protection mode includes at least one of encryption protection and integrity protection.

Further optionally, the determining unit 1202 is further configured to: obtain a security capability of the terminal device, a security policy of the access network node, and an identifier associated with the service; determine an AS security algorithm based on the security capability of the terminal device and a security capability of the access network node; and obtain a security key based on the security policy of the access network node, the AS security algorithm, and an access network key $K_{an}$; and the sending unit 1203 is further configured to send the AS security algorithm and the identifier associated with the service that are determined by the determining unit 1202 to the terminal device.

Further, the access network node may further include:

an execution unit 1204, configured to perform security protection on the data of the service based on the AS security algorithm, the security key, and the identifier associated with the service.

Optionally, in another implementation scenario, when determining not to perform security protection on the data of the service, the access network node further includes:

a sending unit 1203, configured to indicate, to the terminal device, that the access network node is not to perform security protection on the data of the service.

Figure 13:
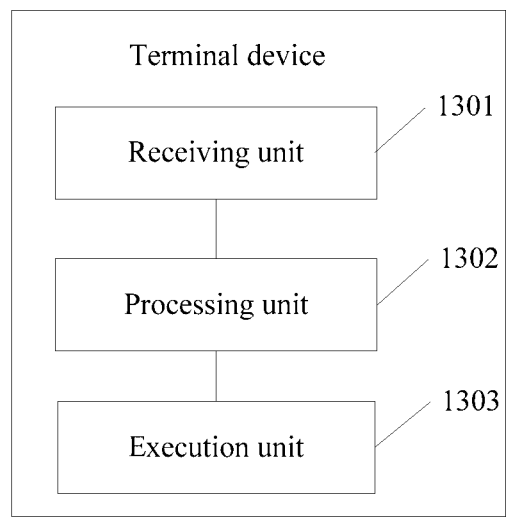
FIG. 13 is a schematic structural diagram of a terminal device according to an embodiment of the present disclosure.

An embodiment of the present disclosure provides a terminal device, where the terminal device may be configured to perform the actions or steps of the terminal device in the embodiment shown in FIG. 5, or may be configured to perform the actions or steps of the terminal device in the embodiments shown in FIG. 6A to FIG. 9B. As shown in FIG. 13, the terminal device includes a receiving unit 1301, a processing unit 1302, and an execution unit 1303.

The receiving unit 1301 is configured to receive, from an access network node, an access stratum AS security algorithm and an identifier associated with a service of the terminal device.

The processing unit 1302 is configured to obtain a first security key based on the AS security algorithm received by the receiving unit 1301, an access network key $K_{an}$, and an AS security protection mode that is of data of the service and is indicated by the access network node, where the AS security protection mode includes at least one of encryption protection and integrity protection.

The execution unit 1303 is configured to perform security protection on the data of the service based on the first security key obtained by the processing unit 1302, the AS security algorithm, and the identifier associated with the service.

Optionally, the receiving unit 1301 is further configured to perform step 504, and the processing unit 1302 is further configured to perform step 505.

The terminal device provided in the foregoing embodiment is configured to perform security protection on the data of the service of the terminal device based on the AS security protection mode indicated by the access network node, that is, perform AS security protection based on the indication of the access network node. This can ensure successful decoupling between security protection by a UPF node and security protection by the access network node, and enhance security.

An embodiment of the present disclosure provides another terminal device, where the terminal device may be configured to perform the actions or steps of the terminal device in the embodiment shown in FIG. 5a, or may be configured to perform the actions or steps of the terminal device in the embodiments shown in FIG. 6A to FIG. 9B. As shown in FIG. 13, the terminal device includes a receiving unit 1301, a processing unit 1302, and an execution unit 1303.

The receiving unit 1301 is configured to receive, from an access network node, an access stratum AS security algorithm and an identifier associated with a service of the terminal device.

The processing unit 1302 is configured to: when the access network node indicates that the access network node is to perform security protection on data of the service, obtain a first security key based on the AS security algorithm received by the receiving unit 1301 and an access network key $K_{an}$.

The execution unit 1303 is configured to perform security protection on the data of the service based on the first security key obtained by the processing unit 1302, the AS security algorithm, and the identifier associated with the service.

Optionally, with reference to the terminal device in the foregoing two embodiments, the receiving unit 1301 is further configured to receive a user plane UP security algorithm from a core network node; and the processing unit 1302 is further configured to obtain a second security key based on the UP security algorithm and a user plane root key $K_{up}$.

Further, the processing unit 1302 is further configured to obtain the second security key based on the UP security algorithm, the $K_{up}$, and a UP security protection mode that is of the data of the service and is indicated by the core network node, where the UP security protection mode includes at least one of encryption protection and integrity protection.

Optionally, the receiving unit 1301 is further configured to perform step 504, and the processing unit 1302 is further configured to perform step 505.

The terminal device provided in the foregoing embodiment is configured to perform AS security protection on the data of the service of the terminal device based on the indication of the access network node. Therefore, security protection by a UPF node and security protection by the access network node can be successfully decoupled, and security is enhanced.

An embodiment of the present disclosure provides another terminal device. For a structure of the terminal device, refer to FIG. 13. The terminal device may be configured to perform the actions or steps of the terminal device in the embodiment shown in FIG. 5b, or may be configured to perform the actions or steps of the terminal device in the embodiments shown in FIG. 6A to FIG. 9B. The receiving unit 1301 is configured to perform step 501b, the processing unit 1302 is configured to perform step 502b, and the execution unit 1303 is configured to perform step 503b.

Optionally, the receiving unit 1301 is further configured to perform step 504b, the processing unit 1302 is further configured to perform step 505b, and the execution unit 1303 is further configured to perform step 506b.

Figure 14:
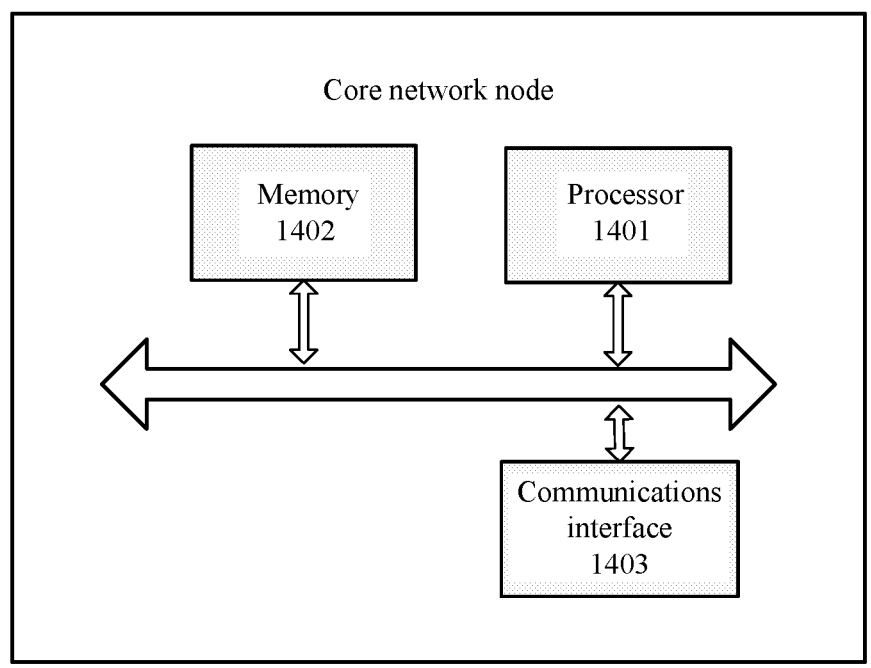
FIG. 14 is a structural diagram of hardware of a core network node according to an embodiment of the present disclosure.

As shown in FIG. 14, an embodiment of the present disclosure provides a core network node. The core network node may be an AMF node or an SMF node, and may be configured to perform the actions or steps of the core network node in the embodiment shown in FIG. 2, or may be configured to perform the actions or steps of the SMF node in the embodiments shown in FIG. 6A to FIG. 8, or may be configured to perform the actions or steps of the AMF node in the embodiment shown in FIG. 9A and FIG. 9B. The core network node specifically includes a processor 1401, a memory 1402, and a communications interface 1403.

The memory 1402 is configured to store a program.

The processor 1401 is configured to execute the program stored in the memory 1402 to implement the actions of the core network node in the embodiment shown in FIG. 2, or the actions of the SMF node in the embodiments shown in FIG. 6A to FIG. 8, or the actions of the AMF node in the embodiment shown in FIG. 9A and FIG. 9B. Details are not described again.

Figure 15:
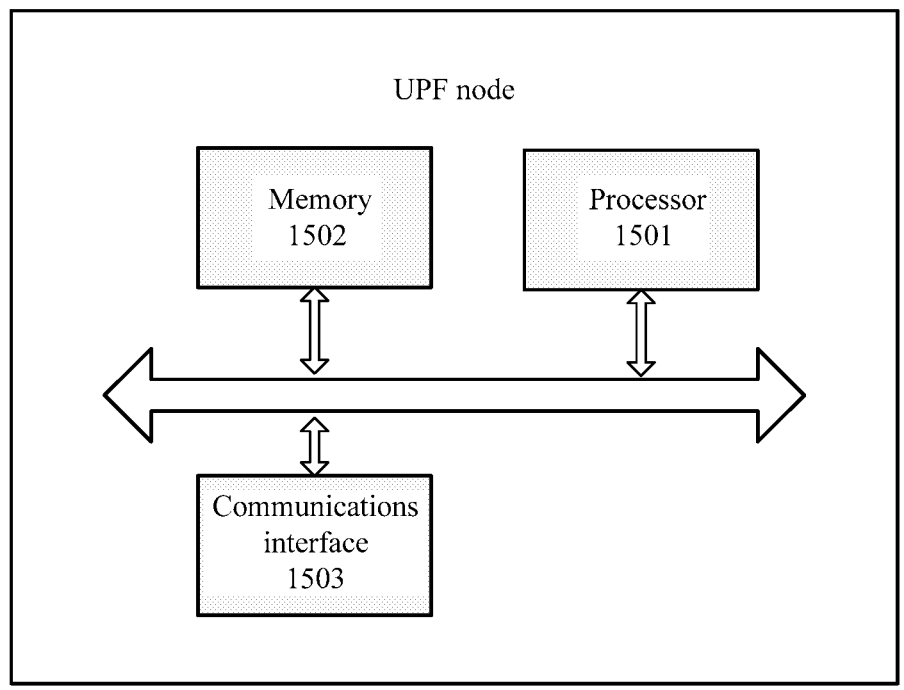
FIG. 15 is a structural diagram of hardware of a UPF node according to an embodiment of the present disclosure.

As shown in FIG. 15, an embodiment of the present disclosure provides a UPF node, where the UPF node may be configured to perform the actions or steps of the UPF node in the embodiment shown in FIG. 3, or may be configured to perform the actions or steps of the UPF node in the embodiments shown in FIG. 6A to FIG. 9B. The UPF node specifically includes a processor 1501, a memory 1502, and a communications interface 1503.

The memory 1502 is configured to store a program.

The processor 1501 is configured to execute the program stored in the memory 1502 to implement the actions of the UPF node in the embodiment shown in FIG. 3, or the actions of the UPF node in the embodiments shown in FIG. 6A to FIG. 9B. Details are not described again.

Figure 16:
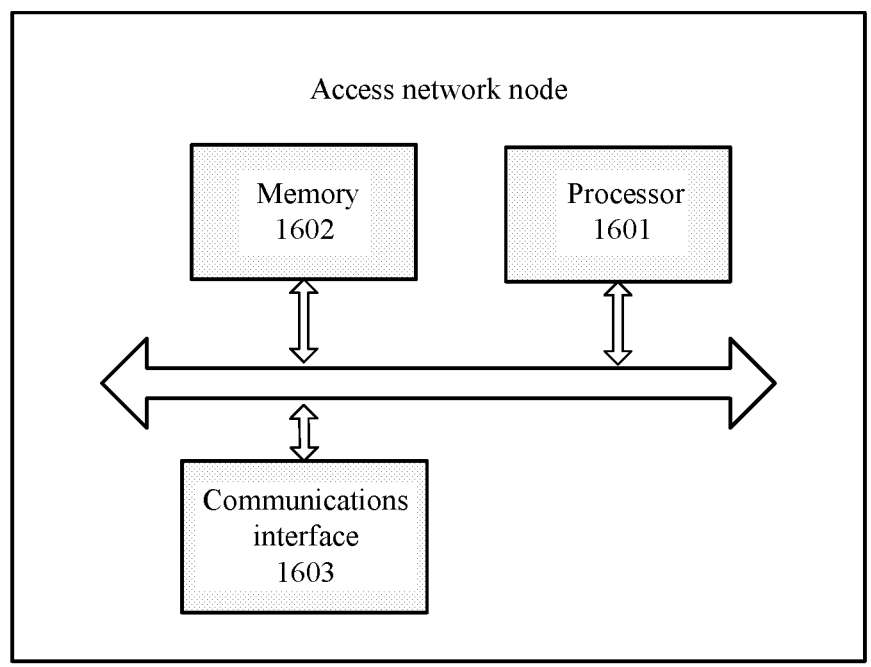
FIG. 16 is a structural diagram of hardware of an access network node according to an embodiment of the present disclosure.

As shown in FIG. 16, an embodiment of the present disclosure provides an access network node, where the access network node may be configured to perform the actions or steps of the access network node in the embodiment shown in FIG. 4 or FIG. 4a or FIG. 4b, or may be configured to perform the actions or steps of the access network node in the embodiments shown in FIG. 6A to FIG. 9B. The access network node specifically includes a processor 1601, a memory 1602, and a communications interface 1603.

The memory 1602 is configured to store a program.

The processor 1601 is configured to execute the program stored in the memory 1602 to implement the actions of the access network node in the embodiment shown in FIG. 4 or FIG. 4a or FIG. 4b, or the actions of the access network node in the embodiments shown in FIG. 6A to FIG. 9B. Details are not described again.

Figure 17:
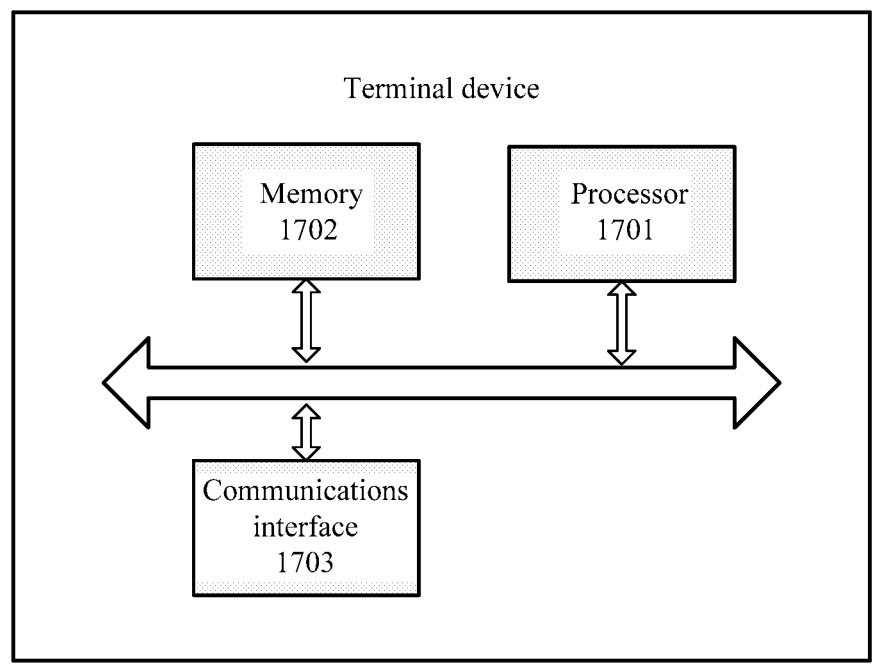
FIG. 17 is a structural diagram of hardware of a terminal device according to an embodiment of the present disclosure.

As shown in FIG. 17, an embodiment of the present disclosure provides a terminal device, where the terminal device may be configured to perform the actions or steps of the terminal device in the embodiment shown in FIG. 5 or FIG. 5a or FIG. 5b, or may be configured to perform the actions or steps of the terminal device in the embodiments shown in FIG. 6A to FIG. 9B. The terminal device specifically includes a processor 1701, a memory 1702, and a communications interface 1703.

The memory 1702 is configured to store a program.

The processor 1701 is configured to execute the program stored in the memory 1702 to implement the actions of the terminal device in the embodiment shown in FIG. 5 or FIG. 5a or FIG. 5b, or the actions of the terminal device in the embodiments shown in FIG. 6A to FIG. 9B. Details are not described again.

The communications interface 1703 may be specifically a transceiver.

In the embodiments of the present disclosure, mutual reference may be made between the foregoing embodiments. Therefore, same or similar steps and terms are not described one by one again.

An embodiment of the present disclosure provides a system, including a core network node and a UPF node, where the core network node is specifically shown in FIG. 10 or FIG. 14, and the UPF node is shown in FIG. 11 or FIG. 15. Optionally, the system further includes the access network node shown in FIG. 12 or FIG. 16. Further, the system may further include the terminal device shown in FIG. 13 or FIG. 17.

An embodiment of the present disclosure provides another system, including the access network node shown in FIG. 12 or FIG. 16, and the terminal device shown in FIG. 13 or FIG. 17. Optionally, the system further includes the core network node shown in FIG. 10 or FIG. 14, and the UPF node shown in FIG. 11 or FIG. 15.

In the embodiments of the present disclosure, in the foregoing embodiments of this application, the network node may be the UPF node or the access network node; security protection may be at least one of integrity protection and encryption protection; the security key may be at least one of the integrity key and the encryption key; and alternatively, performing security protection on the data of the service may be performing a security protection operation on the data of the service, or performing a security protection procedure. This is not limited.

In the embodiments of the present disclosure, the core network node indicates, to the UPF node or the access network node, that the network node that is to perform security protection on the data of the service is the UPF node, and the core network node indicates, to the UPF node or the access network node, that the network node that is to perform security protection on the data of the service is not the access network node. Specifically, the foregoing two cases may be that the core network node indicates, to the UPF node or the access network node, that the UPF node is to start or enable or activate or perform security protection, where the security protection is intended for the data of the service.

The core network node indicates, to the UPF node or the access network node, that the network node that is to perform security protection on the data of the service is not the UPF node, and the core network node indicates, to the UPF node or the access network node, that the network node that is to perform security protection on the data of the service is the access network node. Specifically, the foregoing two cases may be that the core network node indicates, to the UPF node or the access network node, that the access network node is to start or enable or activate or perform security protection, where the security protection is intended for the data of the service.

In addition, when the network node that is to perform security protection on the data of the service is not the UPF node, or when the network node that is to perform security protection on the data of the service is the UPF node, the UPF node may be a specific UPF node, for example, a UPF node serving the terminal device.

When the network node that is to perform security protection on the data of the service is the access network node, and when the network node that is to perform security protection on the data of the service is not the access network node, the access network node may be an access network node serving the terminal device.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

What is claimed is:

1. A method for protecting service data in a communications system, wherein the method comprises:
    obtaining, by a core network node, information associated with a service of a terminal device; and
    determining, by the core network node and based on the information associated with the service, a network device from at least one of an access network node serving the terminal device or a user plane function (UPF) node serving the terminal device, wherein the network device is selected by the core network node and performs security protection on the service data.

2. The method according to claim 1, wherein the determining, by the core network node and based on the information associated with the service, a network device comprises:
    determining, by the core network node, the network device based on a security capability of the UPF node connected to the core network node and the information associated with the service; or
    determining, by the core network node, the network device based on a corresponding relationship indicating that the information associated with the service corresponds to the network device.

3. The method according to claim 1, wherein the obtaining, by a core network node, information associated with a service of a terminal device comprises:
    receiving, by the core network node, a request message from the terminal device, wherein the request message is used to request to set up a session for the service, and wherein the request message comprises the information associated with the service; or
    obtaining, by the core network node and based on slice information associated with the core network node, the information associated with the service.

4. The method according to claim 1, wherein the network device is the UPF node, and wherein the method further comprises:
  sending, by the core network node, security-related parameters to the UPF node.

5. The method according to claim 4, wherein the security-related parameters comprise a user plane root key $K_{up}$, a security capability of the terminal device, and a security policy of the UPF node.

6. The method according to claim 4, wherein the method further comprises:
  indicating, by the core network node, a user plane (UP) security protection mode of the service data to the UPF node, wherein the UP security protection mode comprises at least one of protection by data encryption or protection by data integrity; or
  indicating, by the core network node and to the UPF node, that the UPF node is the network device determined by the core network node.

7. The method according to claim 6, wherein the method further comprises:
  sending, by the core network node, an identifier associated with the service to the access network node.

8. The method according to claim 7, wherein the method further comprises:
  indicating, by the core network node to the access network node, that the access network node is not the network device determined by the core network node; or
  indicating, by the core network node to the access network node, that the UPF node is the network device determined by the core network node; or
  indicating, by the core network node, the UP security protection mode of the service data to the access network node.

9. The method according to claim 1, wherein the network device is the UPF node, wherein the core network node is a session management (SMF) node, and wherein the method further comprises:
  determining, by the SMF node, a UP security algorithm based on a first security capability of the terminal device and a second security capability of the UPF node;
  obtaining, by the SMF node, a security key based on the UP security algorithm, a user plane root key $K_{up}$, and a security policy of the UPF node; and
  sending, by the SMF node, the UP security algorithm, the security key, and an identifier associated with the service to the UPF node.

10. The method according to claim 1, wherein the network device is the access network node, and wherein the method further comprises:
  sending, by the core network node, a security policy of the access network node and an identifier associated with the service to the access network node; and
  indicating, by the core network node to the access network node, that the access network node is the network device determined by the core network node, or indicating, by the core network node to the access network node, that the UPF node is not the network device determined by the core network node.

11. The method according to claim 10, wherein the method further comprises one of:
  instructing, by the core network node, the UPF node serving the terminal device that security protection on the service data is not to be performed;
  indicating, by the core network node and to the UPF node serving the terminal device, that the UPF node is not the network device determined by the core network node; or
  indicating, by the core network node and to the UPF node serving the terminal device, that the access network node is the network device determined by the core network node.

12. A communication device, comprising at least one processor and a memory, wherein the memory is configured to store one or more instructions, when executed by the at least one processor, cause the at least one processor to:
  obtain information associated with a service of a terminal device; and
  determine, based on the information associated with the service, a network device from at least one of an access network node serving the terminal device or a user plane function (UPF) node serving the terminal device, wherein the network device is selected by the communication device and performs security protection on data of the service.

13. The communication device according to claim 12, wherein the one or more instructions, when executed by the at least one processor, cause the at least one processor to:
  determine the network device based on a security capability of the UPF node connected to the communication device and the information associated with the service; or
  determine the network device based on a corresponding relationship indicating that the information associated with the service corresponds to the network device.

14. The communication device according to claim 12, wherein the one or more instructions, when executed by the at least one processor, cause the at least one processor to:
  receive a request message from the terminal device, wherein the request message is used to request to set up a session for the service, and wherein the request message comprises the information associated with the service; or
  obtain, based on slice information associated with the communication device, the information associated with the service.

15. The communication device according to claim 12, wherein the network device is the UPF node, and wherein the one or more instructions, when executed by the at least one processor, cause the at least one processor to:
  send security-related parameters to the UPF node.

16. The communication device according to claim 15, wherein the security-related parameters comprise a user plane root key $K_{up}$, a security capability of the terminal device, and a security policy of the UPF node.

17. The communication device according to claim 15, wherein the one or more instructions, when executed by the at least one processor, cause the at least one processor to:
  indicate a user plane UP security protection mode of the data of the service to the UPF node, wherein the UP security protection mode comprises at least one of protection by data encryption or protection by data integrity; or
  indicate, to the UPF node, that the UPF node is the network device determined by the communication device.

18. The communication device according to claim 12, wherein the network device is the UPF node, wherein the communication device is a session management function (SMF) node, and wherein the one or more instructions, when executed by the at least one processor, cause the at least one processor to:

determine a UP security algorithm based on a first security capability of the terminal device and a second security capability of the UPF node;

obtain a security key based on the UP security algorithm, a user plane root key $K_{up}$, and a security policy of the UPF node; and send the UP security algorithm, the security key, and an identifier associated with the service to the UPF node.

19. The communication device according to claim 12, wherein the network device is the access network node, and wherein the one or more instructions, when executed by the at least one processor, cause the at least one processor to:

send a security policy of the access network node and an identifier associated with the service to the access network node; and indicate, to the access network node, that the access network node is the network device determined by the communication device, or indicate, to the access network node, that the UPF node is not the network device determined by the communication device.

20. The communication device according to claim 19, wherein the one or more instructions, when executed by the at least one processor, cause the at least one processor to one of:

instruct the UPF node serving the terminal device that security protection on the data of the service is not to be performed;

indicate, to the UPF node serving the terminal device, that the UPF node is not the network device determined by the communication device; or indicate, to the UPF node serving the terminal device, that the access network node is the network device determined by the communication device.

\* \* \* \* \*